US011926743B2

(12) United States Patent
Johnson et al.

(10) Patent No.: US 11,926,743 B2
(45) Date of Patent: *Mar. 12, 2024

(54) SYSTEMS AND METHODS OF MAKING CARBON PARTICLES WITH THERMAL TRANSFER GAS

(71) Applicant: Monolith Materials, Inc., Lincoln, NE (US)

(72) Inventors: Peter L. Johnson, Mountain View, CA (US); Alexander F. Hoermann, Menlo Park, CA (US)

(73) Assignee: MONOLITH MATERIALS, INC., Lincoln, NE (US)

( * ) Notice: Subject to any disclaimer, the term of this patent is extended or adjusted under 35 U.S.C. 154(b) by 458 days.

This patent is subject to a terminal disclaimer.

(21) Appl. No.: 16/563,008

(22) Filed: Sep. 6, 2019

(65) Prior Publication Data
US 2020/0239696 A1    Jul. 30, 2020

Related U.S. Application Data

(63) Continuation of application No. PCT/US2018/021627, filed on Mar. 8, 2018.

(60) Provisional application No. 62/468,824, filed on Mar. 8, 2017.

(51) Int. Cl.
*C09C 1/50* (2006.01)
*C01B 3/24* (2006.01)
*C01B 32/05* (2017.01)

(52) U.S. Cl.
CPC .................. *C09C 1/50* (2013.01); *C01B 3/24* (2013.01); *C01B 32/05* (2017.08); *C01B 2203/0272* (2013.01); *C01B 2203/085* (2013.01); *C01B 2203/1235* (2013.01); *C01P 2006/12* (2013.01)

(58) Field of Classification Search
CPC ................................ C09C 1/50; C01B 32/05
See application file for complete search history.

(56) References Cited

U.S. PATENT DOCUMENTS

| | | |
|---|---|---|
| 1,339,225 A | 5/1920 | Rose |
| 1,536,612 A | 5/1925 | Lewis |
| 1,597,277 A | 8/1926 | Jakowsky |
| 2,002,003 A | 5/1935 | Otto et al. |
| 2,039,312 A | 5/1936 | Goldman |
| 2,062,358 A | 12/1936 | Frolich |
| 2,393,106 A | 1/1946 | Bernard et al. |
| 2,557,143 A | 6/1951 | Royster |
| 2,572,851 A | 10/1951 | Daniel et al. |
| 2,603,669 A | 7/1952 | Chappell |
| 2,616,842 A | 11/1952 | Charles et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,951,143 A | 8/1960 | Anderson et al. |
| 3,009,783 A | 11/1961 | Charles et al. |
| 3,073,769 A | 1/1963 | George et al. |
| 3,127,536 A | 3/1964 | Mclane |
| 3,253,890 A | 5/1966 | De et al. |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,342,554 A | 9/1967 | Jordan et al. |
| 3,344,051 A | 9/1967 | Latham, Jr. et al. |
| 3,408,164 A | 10/1968 | Johnson |
| 3,409,403 A | 11/1968 | Geir et al. |
| 3,420,632 A | 1/1969 | Ryan et al. |
| 3,431,074 A | 3/1969 | Jordan et al. |
| 3,453,488 A | 7/1969 | Cann et al. |
| 3,464,793 A | 9/1969 | Jordan et al. |
| 3,619,138 A | 11/1971 | Gunnell |
| 3,619,140 A | 11/1971 | Morgan et al. |
| 3,637,974 A | 1/1972 | Tajbl et al. |
| 3,673,375 A | 6/1972 | Camacho et al. |
| 3,725,103 A | 4/1973 | Jordan et al. |
| 3,852,399 A | 12/1974 | Rothbuhr et al. |
| 3,922,335 A | 11/1975 | Jordan et al. |
| 3,981,654 A | 9/1976 | Rood et al. |

(Continued)

FOREIGN PATENT DOCUMENTS

| | | |
|---|---|---|
| AU | 2897071 A | 11/1972 |
| BG | 98848 A | 5/1995 |

(Continued)

OTHER PUBLICATIONS

AP-42, Fifth Edition, vol. 1, Chapter 6: Organic Chemical Process Industry, Section 6.1: Carbon Black (1983): 1-10.
Ayala, et al., Carbon Black Elastomer Interaction. Rubber Chemistry and Technology (1991): 19-39.
Bakken, et al., Thermal plasma process development in Norway. Pure and Applied Chemistry 70.6 (1998): 1223-1228.
Biscoe, et al., An X-ray study of carbon black. Journal of Applied physics, 1942; 13: 364-371.
Boehm, Some Aspects of Surface Chemistry of Carbon Blacks and Other Carbons. Carbon. 32.5. (1994): 759-769.

(Continued)

*Primary Examiner* — Stuart L Hendrickson
(74) *Attorney, Agent, or Firm* — Wilson Sonsini Goodrich & Rosati

(57) ABSTRACT

Systems and methods of making carbon particles with thermal transfer gas. A method of making carbon particles may comprise heating a thermal transfer gas by Joule heating and contacting the thermal transfer gas with a reactive hydrocarbon feedstock gas to generate the carbon particles and hydrogen gas. A method of making carbon particles may comprise heating a thermal transfer gas with the aid of Joule heating and mixing the thermal transfer gas with a hydrocarbon feedstock gas to generate the carbon particles.

17 Claims, 13 Drawing Sheets

(56) References Cited

U.S. PATENT DOCUMENTS

| | | | |
|---|---|---|---|
| 3,981,659 A | 9/1976 | Myers | |
| 3,984,743 A | 10/1976 | Horie | |
| 3,998,934 A | 12/1976 | Vanderveen | |
| 4,028,072 A | 6/1977 | Braun et al. | |
| 4,035,336 A | 7/1977 | Jordan et al. | |
| 4,057,396 A | 11/1977 | Matovich | |
| 4,075,160 A | 2/1978 | Mills et al. | |
| 4,088,741 A | 5/1978 | Takewell | |
| 4,101,639 A | 7/1978 | Surovikin et al. | |
| 4,138,471 A | 2/1979 | Lamond et al. | |
| 4,199,545 A | 4/1980 | Matovich | |
| 4,282,199 A | 8/1981 | Lamond et al. | |
| 4,289,949 A | 9/1981 | Raaness et al. | |
| 4,292,291 A | 9/1981 | Rothbuhr et al. | |
| 4,317,001 A | 2/1982 | Silver et al. | |
| 4,372,937 A | 2/1983 | Johnson | |
| 4,404,178 A | 9/1983 | Johnson et al. | |
| 4,431,624 A | 2/1984 | Casperson | |
| 4,452,771 A | 6/1984 | Hunt | |
| 4,460,558 A | 7/1984 | Johnson | |
| 4,472,172 A | 9/1984 | Sheer et al. | |
| 4,543,470 A | 9/1985 | Santen et al. | |
| 4,553,981 A | 11/1985 | Fuderer | |
| 4,577,461 A | 3/1986 | Cann | |
| 4,597,776 A | 7/1986 | Ullman et al. | |
| 4,601,887 A | 7/1986 | Dorn et al. | |
| 4,678,888 A | 7/1987 | Camacho et al. | |
| 4,689,199 A | 8/1987 | Eckert et al. | |
| 4,755,371 A | 7/1988 | Dickerson | |
| 4,765,964 A | 8/1988 | Gravley et al. | |
| 4,766,287 A * | 8/1988 | Morrisroe | H05H 1/30 219/121.48 |
| 4,787,320 A | 11/1988 | Raaness et al. | |
| 4,864,096 A | 9/1989 | Wolf et al. | |
| 4,977,305 A | 12/1990 | Severance, Jr. | |
| 5,039,312 A | 8/1991 | Hollis, Jr. et al. | |
| 5,045,667 A | 9/1991 | Iceland et al. | |
| 5,046,145 A | 9/1991 | Drouet | |
| 5,105,123 A | 4/1992 | Ballou | |
| 5,138,959 A * | 8/1992 | Kulkarni | C10B 53/00 422/186 |
| 5,147,998 A | 9/1992 | Tsantrizos et al. | |
| 5,206,880 A | 4/1993 | Olsson | |
| 5,222,448 A | 6/1993 | Morgenthaler et al. | |
| 5,352,289 A | 10/1994 | Weaver et al. | |
| 5,399,957 A | 3/1995 | Vierboom | |
| 5,427,762 A | 6/1995 | Steinberg et al. | |
| 5,476,826 A | 12/1995 | Greenwald et al. | |
| 5,481,080 A | 1/1996 | Lynum et al. | |
| 5,486,674 A | 1/1996 | Lynum et al. | |
| 5,500,501 A | 3/1996 | Lynum et al. | |
| 5,527,518 A | 6/1996 | Lynum et al. | |
| 5,593,644 A | 1/1997 | Norman et al. | |
| 5,602,298 A * | 2/1997 | Levin | C01B 32/05 204/158.21 |
| 5,604,424 A | 2/1997 | Shuttleworth | |
| 5,611,947 A | 3/1997 | Vavruska | |
| 5,673,285 A | 9/1997 | Wittle et al. | |
| 5,717,293 A | 2/1998 | Sellers | |
| 5,725,616 A | 3/1998 | Lynum et al. | |
| 5,749,937 A | 5/1998 | Detering et al. | |
| 5,935,293 A | 8/1999 | Detering et al. | |
| 5,951,960 A | 9/1999 | Lynum et al. | |
| 5,989,512 A | 11/1999 | Lynum et al. | |
| 5,997,837 A | 12/1999 | Lynum et al. | |
| 6,058,133 A | 5/2000 | Bowman et al. | |
| 6,068,827 A | 5/2000 | Lynum et al. | |
| 6,099,696 A | 8/2000 | Schwob et al. | |
| 6,188,187 B1 | 2/2001 | Harlan | |
| 6,197,274 B1 | 3/2001 | Mahmud et al. | |
| 6,277,350 B1 | 8/2001 | Gerspacher | |
| 6,358,375 B1 | 3/2002 | Schwob | |
| 6,380,507 B1 | 4/2002 | Childs | |
| 6,395,197 B1 | 5/2002 | Detering et al. | |
| 6,403,697 B1 | 6/2002 | Mitsunaga et al. | |
| 6,441,084 B1 | 8/2002 | Lee et al. | |
| 6,442,950 B1 | 9/2002 | Tung | |
| 6,444,727 B1 | 9/2002 | Yamada et al. | |
| 6,471,937 B1 * | 10/2002 | Anderson | B01J 12/007 423/613 |
| 6,602,920 B2 | 8/2003 | Hall et al. | |
| 6,703,580 B2 | 3/2004 | Brunet et al. | |
| 6,773,689 B1 | 8/2004 | Lynum et al. | |
| 6,955,707 B2 | 10/2005 | Ezell et al. | |
| 7,167,240 B2 | 1/2007 | Stagg | |
| 7,294,314 B2 | 11/2007 | Graham | |
| 7,312,415 B2 | 12/2007 | Ohmi et al. | |
| 7,360,309 B2 | 4/2008 | Vaidyanathan et al. | |
| 7,431,909 B1 | 10/2008 | Rumpf et al. | |
| 7,452,514 B2 | 11/2008 | Fabry et al. | |
| 7,462,343 B2 | 12/2008 | Lynum et al. | |
| 7,563,525 B2 | 7/2009 | Ennis | |
| 7,582,184 B2 | 9/2009 | Tomita et al. | |
| 7,623,340 B1 | 11/2009 | Song et al. | |
| 7,635,824 B2 | 12/2009 | Miki et al. | |
| 7,655,209 B2 | 2/2010 | Rumpf et al. | |
| 7,777,151 B2 | 8/2010 | Kuo | |
| 7,847,009 B2 | 12/2010 | Wong et al. | |
| 7,968,191 B2 | 6/2011 | Hampden-Smith et al. | |
| 8,147,765 B2 | 4/2012 | Muradov et al. | |
| 8,221,689 B2 | 7/2012 | Boutot et al. | |
| 8,257,452 B2 | 9/2012 | Menzel | |
| 8,277,739 B2 | 10/2012 | Monsen et al. | |
| 8,323,793 B2 | 12/2012 | Hamby et al. | |
| 8,443,741 B2 | 5/2013 | Chapman et al. | |
| 8,471,170 B2 | 6/2013 | Li et al. | |
| 8,486,364 B2 | 7/2013 | Vanier et al. | |
| 8,501,148 B2 | 8/2013 | Belmont et al. | |
| 8,581,147 B2 | 11/2013 | Kooken et al. | |
| 8,710,136 B2 | 4/2014 | Yurovskaya et al. | |
| 8,771,386 B2 | 7/2014 | Licht et al. | |
| 8,784,617 B2 | 7/2014 | Novoselov et al. | |
| 8,850,826 B2 | 10/2014 | Ennis | |
| 8,871,173 B2 | 10/2014 | Nester et al. | |
| 8,911,596 B2 | 12/2014 | Vancina | |
| 9,095,835 B2 | 8/2015 | Skoptsov et al. | |
| 9,229,396 B1 | 1/2016 | Wu et al. | |
| 9,315,735 B2 | 4/2016 | Cole et al. | |
| 9,388,300 B2 | 7/2016 | Dikan et al. | |
| 9,445,488 B2 | 9/2016 | Foret | |
| 9,574,086 B2 | 2/2017 | Johnson et al. | |
| 9,679,750 B2 | 6/2017 | Choi et al. | |
| 10,100,200 B2 | 10/2018 | Johnson et al. | |
| 10,138,378 B2 | 11/2018 | Hoermman et al. | |
| 10,370,539 B2 | 8/2019 | Johnson et al. | |
| 10,618,026 B2 | 4/2020 | Taylor et al. | |
| 10,808,097 B2 | 10/2020 | Hardman et al. | |
| 11,149,148 B2 * | 10/2021 | Taylor | C09C 1/48 |
| 11,453,784 B2 | 9/2022 | Hardman et al. | |
| 11,492,496 B2 | 11/2022 | Hoermann et al. | |
| 2001/0029888 A1 | 10/2001 | Sundarrajan et al. | |
| 2001/0039797 A1 | 11/2001 | Cheng | |
| 2002/0000085 A1 | 1/2002 | Hall et al. | |
| 2002/0021430 A1 * | 2/2002 | Koshelev | H05G 2/005 355/53 |
| 2002/0050323 A1 | 5/2002 | Moisan et al. | |
| 2002/0051903 A1 | 5/2002 | Masuko et al. | |
| 2002/0141476 A1 | 10/2002 | Varela | |
| 2002/0157559 A1 | 10/2002 | Brunet et al. | |
| 2003/0103858 A1 | 6/2003 | Baran et al. | |
| 2003/0136661 A1 | 7/2003 | Kong et al. | |
| 2003/0152184 A1 | 8/2003 | Shehane et al. | |
| 2004/0047779 A1 | 3/2004 | Denison | |
| 2004/0071626 A1 | 4/2004 | Smith et al. | |
| 2004/0081609 A1 | 4/2004 | Green et al. | |
| 2004/0081862 A1 | 4/2004 | Herman | |
| 2004/0148860 A1 | 8/2004 | Fletcher | |
| 2004/0168904 A1 | 9/2004 | Anazawa et al. | |
| 2004/0211760 A1 | 10/2004 | Delzenne et al. | |
| 2004/0213728 A1 | 10/2004 | Kopietz et al. | |
| 2004/0216559 A1 | 11/2004 | Kim et al. | |
| 2004/0247509 A1 | 12/2004 | Newby | |
| 2005/0063892 A1 | 3/2005 | Tandon et al. | |
| 2005/0063893 A1 | 3/2005 | Ayala et al. | |

(56) References Cited

U.S. PATENT DOCUMENTS

| | | |
|---|---|---|
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0055017 A1 | 3/2010 | Vanier et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0120137 A1 | 5/2011 | Ennis |
| 2011/0138766 A1 | 6/2011 | Elkady et al. |
| 2011/0155703 A1 | 6/2011 | Winn |
| 2011/0180513 A1 | 7/2011 | Luhrs et al. |
| 2011/0214425 A1 | 9/2011 | Lang et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0177531 A1 | 7/2012 | Chuang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Baker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056127 A1 | 2/2015 | Chavan et al. |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2015/0259211 A9 | 9/2015 | Hung et al. |
| 2016/0030856 A1 | 2/2016 | Kaplan et al. |
| 2016/0243518 A1 | 8/2016 | Spitzl |
| 2016/0293959 A1 | 10/2016 | Blizanac et al. |
| 2016/0296905 A1 | 10/2016 | Kuhl |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson et al. |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2018/0340074 A1 | 11/2018 | Wittmann et al. |
| 2018/0366734 A1 | 12/2018 | Korchev et al. |
| 2019/0048200 A1 | 2/2019 | Johnson et al. |
| 2019/0100658 A1 | 4/2019 | Taylor et al. |
| 2019/0338139 A1 | 11/2019 | Hoermann et al. |
| 2020/0239697 A1 | 7/2020 | Wittmann et al. |
| 2020/0291237 A1 | 9/2020 | Hardman et al. |
| 2021/0017025 A1 | 1/2021 | Hardman |
| 2021/0017031 A1 | 1/2021 | Hardman et al. |
| 2021/0020947 A1 | 1/2021 | Hardman et al. |
| 2021/0120658 A1 | 4/2021 | Moss et al. |
| 2021/0261417 A1 | 8/2021 | Cardinal et al. |
| 2022/0272826 A1 | 8/2022 | Hoermann et al. |
| 2022/0274046 A1 | 9/2022 | Johnson et al. |
| 2022/0339595 A1 | 10/2022 | Taylor et al. |

FOREIGN PATENT DOCUMENTS

| | | |
|---|---|---|
| CA | 830378 A | 12/1969 |
| CA | 964405 A | 3/1975 |
| CA | 2353752 A1 | 1/2003 |
| CA | 2621749 A1 | 8/2009 |
| CN | 85201622 U | 7/1986 |
| CN | 86104761 A | 2/1987 |
| CN | 1059541 A | 3/1992 |
| CN | 1076206 A | 9/1993 |
| CN | 1077329 A | 10/1993 |
| CN | 1078727 A | 11/1993 |
| CN | 1082571 A | 2/1994 |
| CN | 1086527 A | 5/1994 |
| CN | 1196032 A | 10/1998 |
| CN | 1398780 A | 2/2003 |
| CN | 1458966 A | 11/2003 |
| CN | 1491740 A | 4/2004 |
| CN | 1644650 A | 7/2005 |
| CN | 1825531 A | 8/2006 |
| CN | 1833313 A | 9/2006 |
| CN | 101092691 A | 12/2007 |
| CN | 101143296 A | 3/2008 |
| CN | 101193817 A | 6/2008 |
| CN | 101198442 A | 6/2008 |
| CN | 201087175 Y | 7/2008 |
| CN | 201143494 Y | 11/2008 |
| CN | 101368010 A | 2/2009 |
| CN | 101529606 A | 9/2009 |
| CN | 101534930 A | 9/2009 |
| CN | 101657283 A | 2/2010 |
| CN | 101734620 A | 6/2010 |
| CN | 101946080 A | 1/2011 |
| CN | 101958221 A | 1/2011 |

(56) References Cited

FOREIGN PATENT DOCUMENTS

| | | |
|---|---|---|
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |
| CN | 102666686 A | 9/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 104798228 A | 7/2015 |
| CN | 105070518 A | 11/2015 |
| CN | 105073906 A | 11/2015 |
| CN | 105308775 A | 2/2016 |
| CN | 205472672 U | 8/2016 |
| CN | 107709474 A | 2/2018 |
| DE | 211457 A3 | 7/1984 |
| DE | 19807224 A1 | 8/1999 |
| EA | 200300389 A1 | 12/2003 |
| EP | 0315442 A2 | 5/1989 |
| EP | 0325689 A1 | 8/1989 |
| EP | 0616600 A1 | 9/1994 |
| EP | 0635044 B1 | 2/1996 |
| EP | 0635043 B1 | 6/1996 |
| EP | 0861300 A1 | 9/1998 |
| EP | 0982378 A1 | 3/2000 |
| EP | 1017622 A1 | 7/2000 |
| EP | 1088854 A2 | 4/2001 |
| EP | 1188801 A1 | 3/2002 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| EP | 3612600 A1 | 2/2020 |
| EP | 3676220 A1 | 7/2020 |
| EP | 3676335 A1 | 7/2020 |
| EP | 3676901 A1 | 7/2020 |
| EP | 3700980 A1 | 9/2020 |
| EP | 3774020 A1 | 2/2021 |
| FR | 1249094 A | 12/1960 |
| FR | 2891434 A1 | 3/2007 |
| FR | 2937029 A1 | 4/2010 |
| GB | 395893 A | 7/1933 |
| GB | 987498 A | 3/1965 |
| GB | 1068519 | 5/1967 |
| GB | 1400266 A | 7/1975 |
| GB | 1492346 A | 11/1977 |
| GB | 2419883 A | 5/2006 |
| JP | S5021983 B1 | 7/1975 |
| JP | S5987800 A | 5/1984 |
| JP | S6411074 A | 1/1989 |
| JP | H04228270 A | 8/1992 |
| JP | H05226096 A | 9/1993 |
| JP | H06302527 A | 10/1994 |
| JP | H06322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | H09316645 A | 12/1997 |
| JP | H11123562 A | 5/1999 |
| JP | 2001253974 A | 9/2001 |
| JP | 2002121422 A | 4/2002 |
| JP | 2004300334 A | 10/2004 |
| JP | 2005235709 A | 9/2005 |
| JP | 2005243410 A | 9/2005 |
| JP | 5226096 B2 | 7/2013 |
| KR | 20030046455 A | 6/2003 |
| KR | 20080105344 A | 12/2008 |
| KR | 20140075261 A | 6/2014 |
| RU | 2425795 C2 | 8/2011 |
| RU | 2488984 C2 | 7/2013 |
| TW | 200418933 A | 10/2004 |
| WO | WO-9004852 A1 | 5/1990 |
| WO | WO-9204415 A1 | 3/1992 |
| WO | WO-9312030 A1 | 6/1993 |
| WO | WO-9312031 A1 | 6/1993 |
| WO | WO-9312633 A1 | 6/1993 |
| WO | WO-9318094 A1 | 9/1993 |
| WO | WO-9320152 A1 | 10/1993 |
| WO | WO-9320153 A1 | 10/1993 |
| WO | WO-9323331 A1 | 11/1993 |
| WO | WO-9408747 A1 | 4/1994 |
| WO | WO-9618688 A1 | 6/1996 |
| WO | WO-9703133 A1 | 1/1997 |
| WO | WO-9813428 A1 | 4/1998 |
| WO | WO-0018682 A1 | 4/2000 |
| WO | WO-0224819 A1 | 3/2002 |
| WO | WO-03014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2009143576 A1 | 12/2009 |
| WO | WO-2010040840 A2 | 4/2010 |
| WO | WO-2010059225 A1 | 5/2010 |
| WO | WO-2012015313 A1 | 2/2012 |
| WO | WO-2012067546 A2 | 5/2012 |
| WO | WO-2012094743 A1 | 7/2012 |
| WO | WO-2012149170 A1 | 11/2012 |
| WO | WO-2013134093 A1 | 9/2013 |
| WO | WO-2013184074 A1 | 12/2013 |
| WO | WO-2013185219 A1 | 12/2013 |
| WO | WO-2014000108 A1 | 1/2014 |
| WO | WO-2014012169 A1 | 1/2014 |
| WO | WO-2014149455 A1 | 9/2014 |
| WO | WO-2015049008 A1 | 4/2015 |
| WO | WO-2015051893 A1 | 4/2015 |
| WO | WO-2015051898 A1 | 4/2015 |
| WO | WO-2015093947 A1 | 6/2015 |
| WO | WO-2015116797 A1 | 8/2015 |
| WO | WO-2015116798 A1 | 8/2015 |
| WO | WO-2015116800 A1 | 8/2015 |
| WO | WO-2015116807 A1 | 8/2015 |
| WO | WO-2015116811 A1 | 8/2015 |
| WO | WO-2015116943 A2 | 8/2015 |
| WO | WO-2016012367 A1 | 1/2016 |
| WO | WO-2016014641 A1 | 1/2016 |
| WO | WO-2016126598 A1 | 8/2016 |
| WO | WO-2016126599 A1 | 8/2016 |
| WO | WO-2016126600 A1 | 8/2016 |
| WO | WO-2017019683 A1 | 2/2017 |
| WO | WO-2017027385 A1 | 2/2017 |
| WO | WO-2017034980 A1 | 3/2017 |
| WO | WO-2017044594 A1 | 3/2017 |
| WO | WO-2017048621 A1 | 3/2017 |
| WO | WO-2017190015 A1 | 11/2017 |
| WO | WO-2017190045 A1 | 11/2017 |
| WO | WO-2018165483 A1 | 9/2018 |
| WO | WO-2018195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |
| WO | WO-2022076306 | 4/2022 |

OTHER PUBLICATIONS

Breeze, Raising steam plant efficiency—Pushing the steam cycle boundaries.PEI Magazine 20.4 (2012) 12 pages.

(56) References Cited

OTHER PUBLICATIONS

Cataldo, The impact of a fullerene-like concept in carbon black science. Carbon 40 (2002): 157-162.
Chiesa, et al., Using Hydrogen as Gas Turbine Fuel. ASME. J. Eng. Gas Turbines Power 127.1. (2005):73-80. doi:10.1115/1.1787513.
Cho, et al., Conversion of natural gas to hydrogen and carbon black by plasma and application of plasma black. Symposia-American Chemical Society, Div. Fuel Chem. 49.1. (2004): 181-183.
Co-pending U.S. Appl. No. 16/097,035, filed Oct. 26, 2018.
Co-pending U.S. Appl. No. 16/445,727, filed Jun. 19, 2019.
Co-pending U.S. Appl. No. 16/807,550, filed Mar. 3, 2020.
Donnet, et al., Carbon Black. New York: Marcel Dekker, (1993): 46, 47 and 54.
Donnet, et al., Observation of Plasma-Treated Carbon Black Surfaces by Scanning Tunnelling Microscopy. Carbon (1994) 32(2): 199-206.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
Extended European Search Report for EP Application No. 15742910.1 dated Jul. 18, 2017.
Extended European Search Report for EP Application No. 15743214.7 dated Jan. 16, 2018.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Fabry, et al., Carbon black processing by thermal plasma. Analysis of the particle formation mechanism. Chemical Engineering Science 56.6 (2001): 2123-2132.
Fulcheri, et al., From methane to hydrogen, carbon black and water. International journal of hydrogen energy 20.3 (1995): 197-202.
Fulcheri, et al., Plasma processing: a step towards the production of new grades of carbon black. Carbon 40.2 (2002): 169-176.
Gago, et al., Growth mechanisms and structure of fullerene-like carbon-based thin films: superelastic materials for tribological applications. Trends in Fullerene Research, Published by Nova Science Publishers, Inc. (2007): 1-46.
Garberg, et al., A transmission electron microscope and electron diffraction study of carbon nanodisks. Carbon 46.12 (2008): 1535-1543.
Grivei, et al., A clean process for carbon nanoparticles and hydrogen production from plasma hydrocarbon cracking. Publishable Report, European Commission Joule III Programme, Project No. JOE3-CT97-0057,circa (2000): 1-25.
Hernandez, et al. Comparison of carbon nanotubes and nanodisks as percolative fillers in electrically conductive composites. Scripta Materialia 58 (2008) 69-72.
Hoyer, et al., Microelectromechanical strain and pressure sensors based on electric field aligned carbon cone and carbon black particles in a silicone elastomer matrix. Journal of Applied Physics 112.9 (2012): 094324.
International Preliminary Report on Patentability for Application No. PCT/US2015/013482 dated Aug. 2, 2016.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Preliminary Report on Patentability for Application No. PCT/US2017/030139 dated Oct. 30, 2018.
International Preliminary Report on Patentability for Application No. PCT/US2017/030179 dated Oct. 30, 2018.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report and Written Opinion for Application No. PCT/US2015/013794 dated Jun. 19, 2015.
International Search Report and Written Opinion for Application No. PCT/US2016/015939 dated Jun. 3, 2016.
International Search Report and Written Opinion for Application No. PCT/US2016/015941 dated Apr. 21, 2016.
International Search Report and Written Opinion for Application No. PCT/US2016/015942 dated Apr. 11, 2016.
International search Report and Written Opinion for Application No. PCT/US2016/044039 dated Oct. 6, 2016.
International Search Report and Written Opinion for Application No. PCT/US2016/045793 dated Oct. 18, 2016.
International Search Report and Written Opinion for Application No. PCT/US2016/047769 dated Dec. 30, 2016.
International Search Report and Written Opinion for Application No. PCT/US2016/050728 dated Nov. 18, 2016.
International search Report and Written Opinion for Application No. PCT/US2016/051261 dated Nov. 18, 2016.
International Search Report and Written Opinion for Application No. PCT/US2017/030139 dated Jul. 19, 2017.
International Search Report and Written Opinion for Application No. PCT/US2017/030179 dated Jul. 27, 2017.
International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report for Application No. PCT/US2015/13482 dated Jun. 17, 2015.
International Search Report for Application No. PCT/US2015/13487 dated Jun. 16, 2015.
Knaapila, et al., Directed assembly of carbon nanocones into wires with an epoxy coating in thin films by a combination of electric field alignment and subsequent pyrolysis. Carbon 49.10 (2011): 3171-3178.
Krishnan, et al., Graphitic cones and the nucleation of curved carbon surfaces. Nature 388.6641 (1997): 451-454.
Larouche, et al.,Nitrogen Functionalization of Carbon Black in a Thermo-Convective Plasma Reactor. Plasma Chem Plasma Process (2011) 31: 635-647.
Medalia, et al., Tinting Strength of Carbon Black. Journal of Colloid and Interface Science 40.2. (1972).
Naess, et al., Carbon nanocones: wall structure and morphology. Science and Technology of advanced materials (2009): 7 pages.
Partial International Search Report for Application No. PCT/US2018/028619 dated Jun. 18, 2018.
PCT/US2018/021627 International Search Report and Written Opinion dated May 31, 2018.
PCT/US2018/028619 International Search Report and Written Opinion dated Aug. 9, 2018.
PCT/US2018/048374 International Search Report and Written Opinion dated Nov. 21, 2018.

(56) References Cited

OTHER PUBLICATIONS

PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
Polman, et al., Reduction of CO2 emissions by adding hydrogen to natural gas. IEA Green House Gas R&D programme (2003): 1-98.
Pristavita, et al. Carbon blacks produced by thermal plasma: the influence of the reactor geometry on the product morphology. Plasma Chemistry and Plasma Processing 30.2 (2010): 267-279.
Pristavita, et al., Carbon nanoparticle production by inductively coupled thermal plasmas: controlling the thermal history of particle nucleation. Plasma Chemistry and Plasma Processing 31.6 (2011): 851-866.
Pristavita, et al., Volatile Compounds Present in Carbon Blacks Produced by Thermal Plasmas. Plasma Chemistry and Plasma Processing 31.6 (2011): 839-850.
Reese, Resurgence in American manufacturing will be led by the rubber and tire industry. Rubber World. 255. (2017): 18-21 and 23.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Search Report for Application No. RU2016135213 dated Feb. 12, 2018.
Sun, et al., Preparation of carbon black via arc discharge plasma enhanced by thermal pyrolysis. Diamond & Related Materials (2015), doi: 10.1016/j.diamond.2015.11.004, 47 pages.
Supplementary Partial European Search Report for EP Application No. 15743214.7 dated Sep. 12, 2017.
Translation of Official Notification of RU Application No. 2016135213 dated Feb. 12, 2018.
Tsujikawa, et al., Analysis of a gas turbine and steam turbine combined cycle with liquefied hydrogen as fuel. International Journal of Hydrogen Energy 7.6 (1982): 499-505.
U.S. Appl. No. 14/591,541 Notice of Allowance dated Sep. 17, 2018.
U.S. Environmental Protection Agency, Guide to Industrial Assessments for Pollution Prevention and Energy Efficiency. EPA 625/R-99/003 (1999): 474 pages.
U.S. Appl. No. 14/591,528 Office Action dated Jan. 17, 2019.
U.S. Appl. No. 15/548,346 Office Action dated Oct. 22, 2019.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Jul. 11, 2016.
U.S. Appl. No. 14/591,476 Office Action dated Jun. 7, 2018.
U.S. Appl. No. 14/591,476 Office Action dated Mar. 16, 2016.
U.S. Appl. No. 14/591,476 Office Action dated Oct. 13, 2017.
U.S. Appl. No. 14/591,528 Office Action dated Jan. 16, 2018.
U.S. Appl. No. 14/591,528 Office Action dated Oct. 28, 2019.
U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Actionn dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.
U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated Aug. 3, 2016.
U.S. Appl. No. 14/610,299 Notice of Allowance dated Feb. 20, 2020.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Apr. 20, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/221,088 Office Action dated Sep. 19, 2017.
U.S. Appl. No. 15/229,608 Office Action dated Apr. 8, 2019.
U.S. Appl. No. 15/229,608 Office Action dated Oct. 25, 2019.
U.S. Appl. No. 15/241,771 Office Action dated Jul. 6, 2018.
U.S. Appl. No. 15/241,771 Office Action dated Mar. 13, 2019.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated May 31, 2019.
U.S. Appl. No. 15/259,884 Office Action dated Oct. 11, 2018.
U.S. Appl. No. 15/262,539 Office Action dated Jun. 1, 2018.
U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,348 Notice of Allowance dated Dec. 12, 2019.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 16/159,144 Office Action dated Mar. 26, 2020.
Verfondern, Nuclear Energy for Hydrogen Production. Schriften des Forschungzentrum Julich 58 (2007): 4 pages.
Wikipedia, Heating Element. Oct. 14, 2016. p. 1 para[0001]. Retrieved from https://en.wikipedia.org/w/index.php?title=Heating_element&oldid=744277540 on May 9, 2018.
Wikipedia, Joule Heating. Jan. 15, 2017. p. 1 para[0002]. Retrieved from https://en.wikipedia.org/w/index . Dhp?title=Joule_heating&oldid=760136650 on May 9, 2018.
ASTM International: Standard Test Method for Carbon Black—Morphological Characterization of Carbon Black Using Electron Microscopy, D3849-07 (2011); 7 Pages.
Carmer, et al., Formation of silicon carbide particles behind shock waves. Appl. Phys. Lett. 54 (15), Apr. 10, 1989. 1430-1432.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/072,416, inventors Taylor; Roscoe W. et al., filed Oct. 16, 2020.
Co-pending U.S. Appl. No. 17/239,041, inventors Hardmanned; J. et al., filed Apr. 23, 2021.
Co-pending U.S. Appl. No. 17/245,296, inventors Johnsonpeter; L. et al., filed Apr. 30, 2021.
Co-pending U.S. Appl. No. 17/329,532, inventors Taylorroscoe; W. et al., filed May 25, 2021.
Co-pending U.S. Appl. No. 17/412,913, inventors Johnson; Peter L. et al., filed Aug. 26, 2021.
Co-pending U.S. Appl. No. 17/473,106, inventors Taylorroscoe; W. et al., filed Sep. 13, 2021.
Co-pending U.S. Appl. No. 17/487,982, inventors Hoermannalexander; F. et al., filed Sep. 28, 2021.
Co-pending U.S. Appl. No. 17/529,928, inventors Hardmanned; J. et al., filed Nov. 18, 2021.
Co-pending U.S. Appl. No. 17/741,161, inventors Hoermann; Alexander F. et al., filed May 10, 2022.

(56) References Cited

OTHER PUBLICATIONS

Co-pending U.S. Appl. No. 17/817,482, inventor Hardmanned; J., filed Aug. 4, 2022.
Co-pending U.S. Appl. No. 17/819,075, inventor Ned; J. Hardman, filed Aug. 11, 2022.
Co-pending U.S. Appl. No. 17/862,242, inventors Hardman; Ned J. et al., filed Jul. 11, 2022.
Co-pending U.S. Appl. No. 17/938,304, inventors Roscoe; W. Taylor et al., filed Oct. 5, 2022.
Co-pending U.S. Appl. No. 17/938,591, inventors Alexander; F. Hoermann et al., filed Oct. 6, 2022.
Co-pending U.S. Appl. No. 18/046,723, inventors Peter; L. Johnson et al., filed Oct. 14, 2022.
Co-pending U.S. Appl. No. 18/066,929, inventor Alexander; F. Hoermann, filed Dec. 15, 2022.
Co-pending U.S. Appl. No. 18/172,835, inventor Ned; J. Hardman, filed Feb. 22, 2023.
Database WPI, Week 200323, 2017 Clarivate Analytics. Thomson Scientific, London, GB; Database accession No. 2003-239603, XP002781693.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Frenklach, et al., Silicon carbide and the origin of interstellar carbon grains. Nature, vol. 339; May 18, 1989: 196-198.
Gomez-Pozuelo, et al., Hydrogen production by catalytic methane decomposition over rice husk derived silica. Fuel, Dec. 15, 2021; 306: 121697.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
PCT/US2021/053371 International Search Report and Written Opinion dated Feb. 17, 2022.
PCT/US2022/045451 International Search Report and Wrtitten Opinion dated Feb. 17, 2023.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
U.S. Appl. No. 16/657,386 Notice of Allowance dated May 20, 2022.
U.S. Appl. No. 14/591,528 Office Action dated Sep. 11, 2020.
U.S. Appl. No. 14/610,299 Notice of Allowance dated Dec. 13, 2021.
U.S. Appl. No. 14/610,299 Notice of Allowance dated Nov. 16, 2021.
U.S. Appl. No. 14/610,299 Office Action dated Feb. 17, 2021.
U.S. Appl. No. 15/229,608 Office Action dated Apr. 4, 2022.
U.S. Appl. No. 15/229,608 Office Action dated Feb. 1, 2021.
U.S. Appl. No. 15/229,608 Office Action dated May 15, 2020.
U.S. Appl. No. 15/229,608 Office Action dated Nov. 28, 2022.
U.S. Appl. No. 15/241,771 Office Action dated Dec. 16, 2022.
U.S. Appl. No. 15/241,771 Office Action dated Dec. 30, 2021.
U.S. Appl. No. 15/241,771 Office Action dated Jan. 18, 2023.
U.S. Appl. No. 15/241,771 Office Action dated Jul. 18, 2022.
U.S. Appl. No. 15/241,771 Office Action dated May 1, 2020.
U.S. Appl. No. 15/259,884 Office Action dated Jun. 18, 2021.
U.S. Appl. No. 15/259,884 Office Action dated Mar. 4, 2022.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/410,283 Office Action dated Jul. 31, 2020.
U.S. Appl. No. 15/548,346 Office Action dated Jul. 16, 2021.
U.S. Appl. No. 15/548,346 Office Action dated Mar. 18, 2022.
U.S. Appl. No. 15/548,346 Office Action dated May 4, 2020.
U.S. Appl. No. 15/548,346 Office Action dated Oct. 3, 2022.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Sep. 21, 2021.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Office Action dated Dec. 15, 2020.
U.S. Appl. No. 16/445,727 Notice of Allowance dated Feb. 2, 2023.
U.S. Appl. No. 16/445,727 Notice of Allowance dated Oct. 26, 2022.
U.S. Appl. No. 16/445,727 Office Action dated Apr. 15, 2022.
U.S. Appl. No. 16/445,727 Office Action dated Aug. 17, 2021.
U.S. Appl. No. 16/657,386 Notice of Allowance dated Mar. 10, 2023.
U.S. Appl. No. 16/657,386 Office Action dated Nov. 12, 2021.
U.S. Appl. No. 16/657,386 Office Action dated Sep. 16, 2022.
U.S. Appl. No. 16/802,174 Office Action dated Aug. 31, 2022.
U.S. Appl. No. 16/802,174 Office Action dated Feb. 16, 2022.
U.S. Appl. No. 16/802,190 Office Action dated Oct. 5, 2022.
U.S. Appl. No. 16/802,212 Office Action dated Sep. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/892,199 Notice of Allowance dated Jan. 23, 2023.
U.S. Appl. No. 16/892,199 Notice of Allowance dated Jan. 31, 2023.
U.S. Appl. No. 16/892,199 Office Action dated Jun. 27, 2022.
U.S. Appl. No. 16/802,190 Office Action dated Jan. 31, 2022.
What is Carbon Black, Orion Engineered Carbons, (Year: 2015).

\* cited by examiner

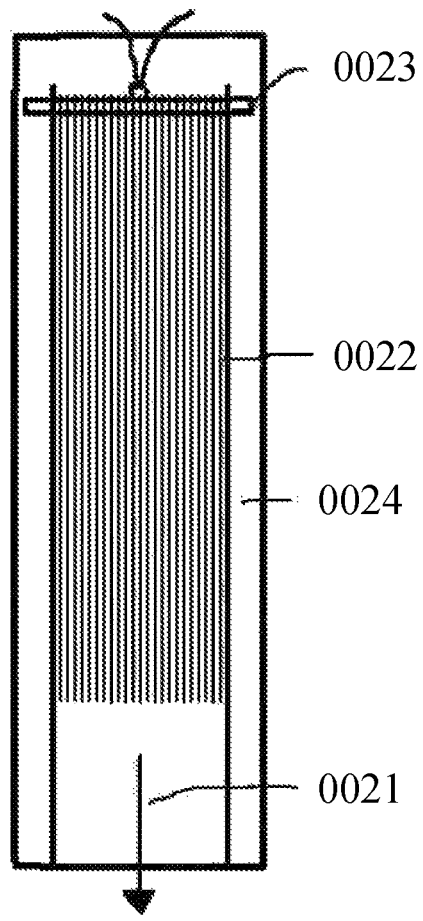
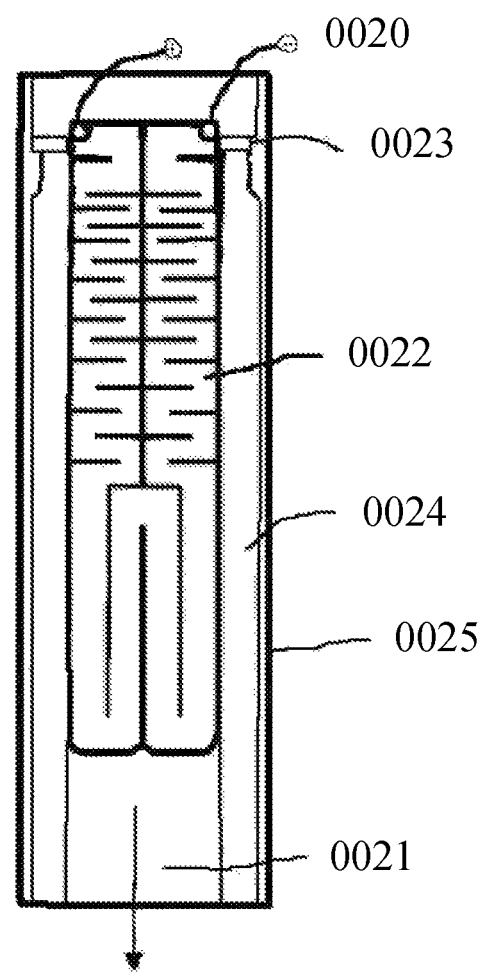
*FIG. 2A*  *FIG. 2B*

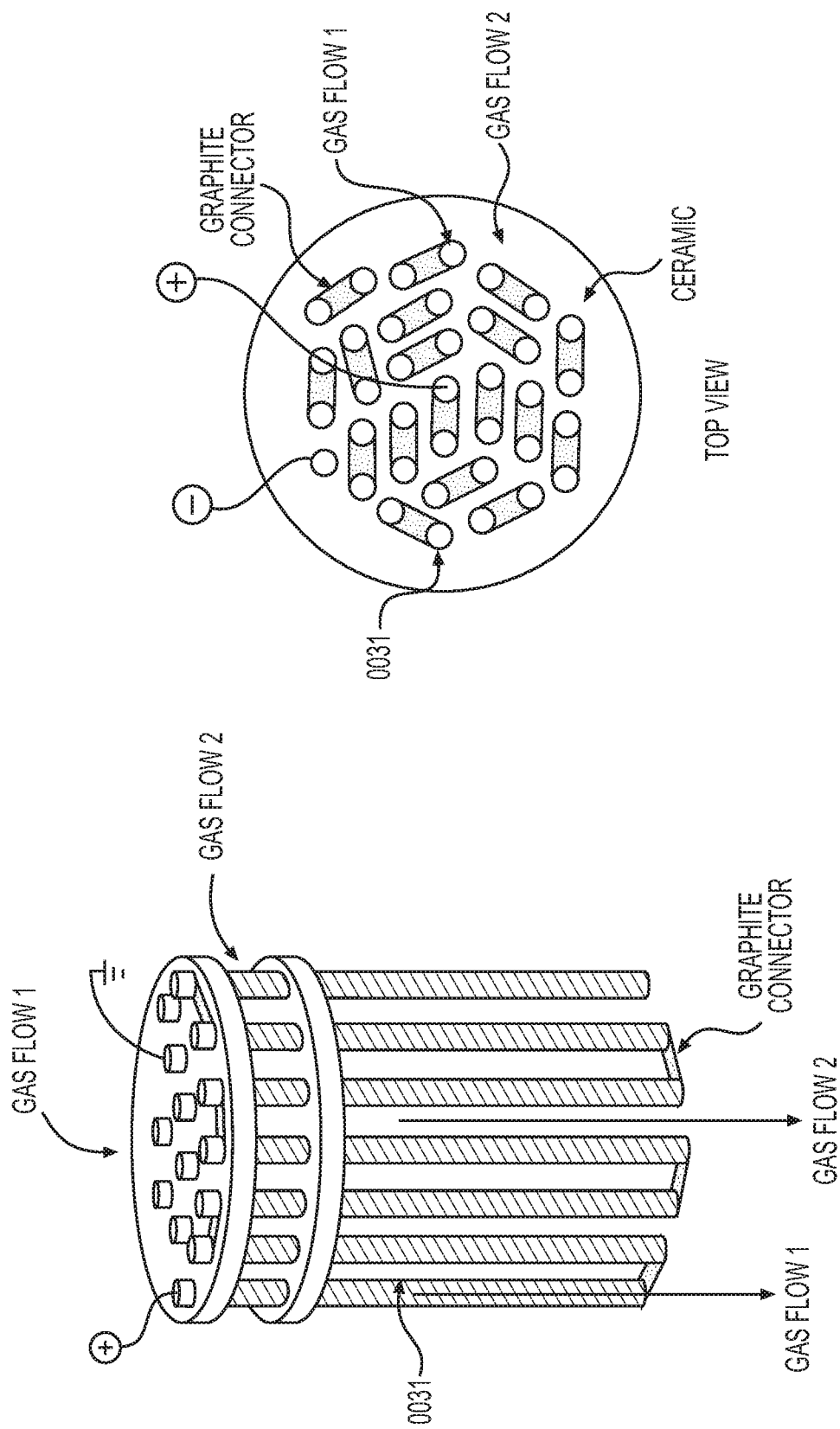

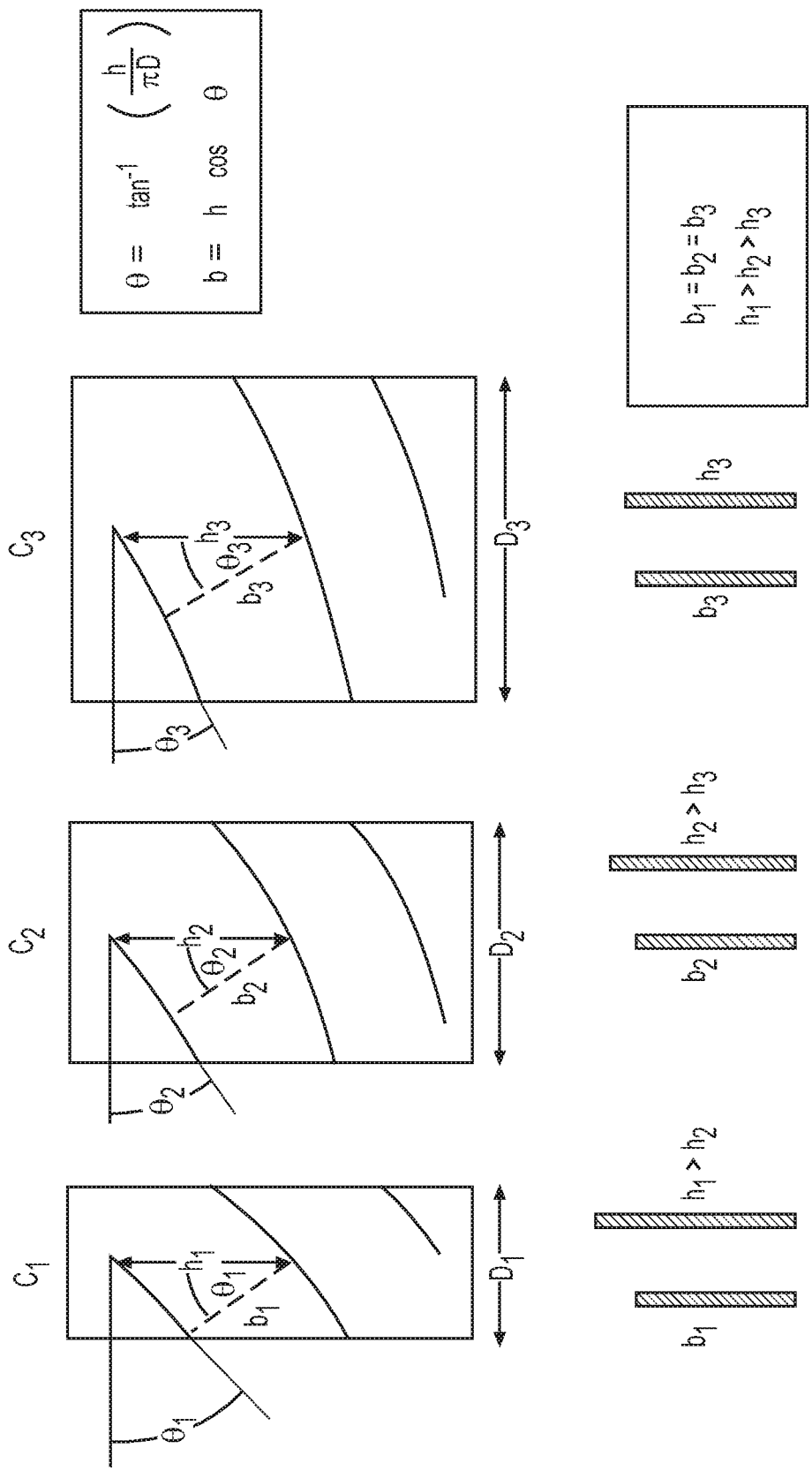
FIG. 7A  FIG. 7B  FIG. 7C

SYSTEMS AND METHODS OF MAKING CARBON PARTICLES WITH THERMAL TRANSFER GAS

CROSS-REFERENCE

This application is a continuation of International Application No. PCT/US2018/021627, filed Mar. 8, 2018, which claims the benefit of U.S. Provisional Application No. 62/468,824, filed Mar. 8, 2017, each of which are entirely incorporated herein by reference.

SUMMARY

The present disclosure provides, for example, a method of making carbon particles, comprising: indirectly heating a thermal transfer gas by Joule heating; and contacting the thermal transfer gas with a hydrocarbon feedstock to generate the carbon particles and hydrogen gas. The method may further comprise using one or more resistive heating elements to heat the thermal transfer gas. One or more of the elements may comprise or be graphite. One or more of the elements may comprise or be tungsten, molybdenum, rhenium, boron nitride, nickel, chromium, iron, or alloys thereof. An element among the elements may be tubular in shape. An element among the elements may be rectangular in shape. An element among the elements may have a star shaped cross-section. An element among the elements may be hollow. The elements may be plates. The method may further comprise cutting a pattern into a plate among the plates that allows for thermal stress relief. The plate may heat the thermal transfer gas from an initial point on the plate and at points on the plate in a direction from the initial point that coincides with a direction of downstream flow of the thermal transfer gas. The plate may have a lower resistance at a point in the direction from the initial point that coincides with the direction of the downstream flow of the thermal transfer gas than a resistance at the initial point. An element among the elements may heat the thermal transfer gas from an initial point on the element and at points on the element in a direction from the initial point that coincides with a direction of downstream flow of the thermal transfer gas. The element may comprise a spiral groove cut into the element that may provide greater cross-sectional area at a point on the element furthest along in the direction from the initial point that coincides with the direction of the downstream flow of the thermal transfer gas. The method may further comprise using a parallel resistive heater with replaceable high temperature components. The method may further comprise using a mounting tube to contain the elements, and using plates to resistively heat the thermal transfer gas. The plates may be graphite plates. The method may further comprise using mounting tubes to resistively heat the thermal transfer gas. The mounting tubes may be connected electrically in series or parallel to one another. The method may further comprise supplying greater than or equal to about 750 kW of power to the elements. The method may further comprise using electric arc based plasma heating downstream of the elements to increase the temperature of the thermal transfer gas. The contacting may be at a thermal transfer gas flowrate greater than or equal to about 500 Nm$^3$/hr (normal cubic meter/hour). The contacting may be at a hydrocarbon feedstock flowrate greater than or equal to about 675 Nm$^3$/hr. The hydrocarbon feedstock may comprise at least about 70% by weight methane, ethane, propane or mixtures thereof. The hydrocarbon feedstock may comprise one or more simple hydrocarbons, one or more aromatic feedstocks, one or more unsaturated hydrocarbons, one or more oxygenated hydrocarbons, or any combination thereof. The hydrocarbon feedstock may comprise methane, ethane, propane, butane, benzene, toluene, xylene, methyl naphthalene, pyrolysis fuel oil, coal tar, coal, heavy oil, oil, bio-oil, bio-diesel, other biologically derived hydrocarbons, ethylene, acetylene, butadiene, styrene, ethanol, methanol, propanol, phenol, ketones, ethers, esters, or any combination thereof. More than about 90% of the hydrocarbon feedstock may be converted into carbon particles on a weight percent carbon basis. The thermal transfer gas and the hydrocarbon feedstock may be contacted with each other upon injection of the hydrocarbon feedstock through one or more cooled injectors. The injectors may be water-cooled. The hydrocarbon feedstock may be pre-heated from a first temperature to a second temperature before coming into contact with the thermal transfer gas. The second temperature may be between about 100° C. and about 800° C. The first temperature may be about 25° C. The thermal transfer gas may be pre-heated via a heat exchanger prior to the heating. The thermal transfer gas may comprise greater than about 60% hydrogen. The thermal transfer gas may be hydrogen. The thermal transfer gas may comprise oxygen, nitrogen, argon, helium, air, hydrogen, carbon monoxide and/or hydrocarbon. The carbon particles may include carbon black. The method may further comprise heating the thermal transfer gas in an oxygen free environment. The method may further comprise heating the thermal transfer gas to at least about 2,000° C. The heating may be performed by resistance heating. More than about 60% of the heat contained in the heated thermal transfer gas may be transferred to the hydrocarbon feedstock within about 2 seconds of initial exposure to the thermal transfer gas.

The present disclosure also provides, for example, a method of making carbon particles, comprising: indirectly heating a thermal transfer gas with the aid of Joule heating; and mixing the thermal transfer gas with a hydrocarbon feedstock to generate the carbon particles. The method may further comprise mixing the thermal transfer gas with the hydrocarbon feedstock to generate the carbon particles and hydrogen gas. The method may further comprise mixing the thermal transfer gas with the hydrocarbon feedstock downstream of the heating. The method may further comprise using the heated thermal transfer gas to heat the hydrocarbon feedstock. The carbon particles may comprise carbon black. The carbon black may have a surface area greater than about 20 square meters per gram (m$^2$/g). The method may further comprise (i) heating the thermal transfer gas to at least about 2,000° C., (ii) heating the thermal transfer gas in an oxygen free environment, or (iii) a combination thereof. The thermal transfer gas may comprise greater than about 60% hydrogen. The method may further comprise heating the thermal transfer gas with the aid of electric arc based plasma heating downstream of the Joule heating. The method may further comprise heating the thermal transfer gas with the aid of resistive heating, electric arc based plasma heating or a combination thereof. The Joule heating may comprise resistive heating. The method may further comprise reducing heat flux from an element with increasing temperature of the thermal transfer gas. The method may further comprise decreasing resistance of the element to reduce the heat flux. The Joule heating may comprise using an element with variable resistance to perform the heating. The method may further comprise using the variable resistance to reduce heat flux with increasing temperature of the thermal transfer gas. The method may further comprise varying resistance of an element to reduce heat flux with increasing temperature of the thermal transfer gas. The method may further comprise reducing the heat flux along the element in a direction coinciding with a direction of flow of the thermal transfer gas. The method may further comprise reducing heat flux from an element with increasing temperature of a material through which the thermal transfer gas flows. A system configured to implement the method may comprise a Joule heater for indirectly heating the thermal transfer gas to be mixed with the hydrocarbon feedstock. The thermal transfer gas may not contact the Joule heater. The thermal transfer gas may not contact an element of the Joule heater.

The present disclosure also provides, for example, a method of making carbon particles, comprising heating a thermal transfer gas by Joule heating and contacting the thermal transfer gas with a reactive hydrocarbon feedstock gas to generate the carbon particles and hydrogen gas. Either resistive or inductive heating elements may be utilized to heat the thermal transfer gas. More than about 60% of the heat contained in the heated thermal transfer gas may be transferred to the hydrocarbon feedstock gas within about 2 seconds of initial exposure to the thermal transfer gas. Electric arc based plasma heating may be used downstream of the resistive or inductive heating elements to increase the temperature of the thermal transfer gas. The elements may comprise or be graphite. The elements may comprise or be tungsten, molybdenum, rhenium, boron nitride, nickel, chromium, iron, or alloys thereof. The thermal transfer gas may be greater than about 60% hydrogen. A mounting tube may be used to contain the elements, and plates may be used to resistively heat the thermal transfer gas. The thermal transfer gas may be heated in mounting tubes, and the mounting tubes may be connected electrically in series or parallel to one another. The heating may be supplied to the elements by greater than or equal to about 750 kW of power. The contacting may be at a thermal transfer gas flowrate greater than or equal to about 500 Nm³/hr (normal cubic meter/hour). The contacting may be at a hydrocarbon feedstock gas flowrate greater than or equal to about 675 Nm³/hr. The reactive hydrocarbon feedstock may comprise at least about 70% by weight methane, ethane, propane or mixtures thereof. The resistive elements may be plates. The plates may have a pattern cut into the plate that allows for thermal stress relief. The thermal transfer gas may contact the plate at a point of initial contact on the plate and at points downstream of that point. The plate may have a resistance at a point downstream of the point of initial contact with the thermal transfer gas that is lower than a resistance at the point of initial contact. The element may be tubular in shape. The element may be rectangular in shape. The element may have a star shaped cross-section. The element may be hollow. The thermal transfer gas may contact the element at a point of initial contact on the element and at points downstream of that point. The element may comprise a spiral groove cut into the element that provides greater cross-sectional area at a point on the element furthest downstream from the point of initial contact with the thermal transfer gas. An inductive heater may be used that comprises a cooled metal coil and a susceptor. The susceptor may be porous or have holes that allow the transport of the thermal transfer gas through the susceptor. More than about 90% of the hydrocarbon feedstock may be converted into carbon particles on a weight percent carbon basis. The thermal transfer gas and the reactive hydrocarbon feedstock gas may be contacted with each other upon injection of the reactive hydrocarbon feedstock gas through one or more cooled injectors. The injectors may be water-cooled. The hydrocarbon feedstock may be pre-heated to a temperature from about 100° C. to about 800° C. before coming into contact with the thermal transfer gas. The thermal transfer gas may be pre-heated via a heat exchanger prior to the heating. The heating may be performed by resistance heating. The thermal transfer gas may be hydrogen. Variable pitch inductance coils may be used to vary watt loading along a susceptor. A parallel resistive heater with replaceable high temperature components may be used. The carbon particles may include carbon black. The plates may be graphite plates. The thermal transfer gas may be heated in an oxygen free environment. The thermal transfer gas may be heated to at least about 2,000° C.

The present disclosure also provides, for example, a method of making carbon particles, comprising heating a thermal transfer gas with the aid of Joule heating and mixing the thermal transfer gas with a hydrocarbon feedstock to generate the carbon particles. The method may comprise mixing the thermal transfer gas with the hydrocarbon feedstock to generate the carbon particles and hydrogen gas. The method may comprise mixing the thermal transfer gas with the hydrocarbon feedstock downstream of the heating. The carbon particles may comprise carbon black. The method may comprise heating the thermal transfer gas to at least about 2,000° C., heating the thermal transfer gas in an oxygen free environment, or a combination thereof. The thermal transfer gas may comprise greater than about 60% hydrogen. The method may comprise heating the thermal transfer gas with the aid of electric arc based plasma heating downstream of the Joule heating. The method may comprise heating the thermal transfer gas with the aid of resistive heating, induction heating, electric arc based plasma heating, or any combination thereof. The Joule heating may comprise resistive heating, induction heating, or a combination thereof. The method may comprise reducing heat flux from an element into the thermal transfer gas with increasing temperature of the thermal transfer gas. The method may comprise (i) decreasing resistance of the element in a downstream direction to reduce the heat flux, or (ii) decreasing magnetic field or increasing thickness of the element in a downstream direction to reduce the heat flux. The Joule heating may comprise using an element with variable resistance to perform the heating. The method may comprise using the variable resistance to reduce heat flux with increasing temperature of the thermal transfer gas in order to protect the element. The Joule heating may comprise using an element with variable magnetic field or variable thickness to perform the heating. The method may comprise using the variable magnetic field or the variable thickness to reduce heat flux with increasing temperature of the thermal transfer gas in order to protect the element. The method may comprise varying resistance, magnetic field or thickness of an element to reduce heat flux in a downstream direction along the element. A system configured to implement the method may comprise a Joule heater for heating the thermal transfer gas to be mixed with the hydrocarbon feedstock.

These and additional embodiments are further described below.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIGS. 2A, 2B, 3A and 3B show examples of element systems;

FIGS. 7A, 7B and 7C show examples of spiral tube heaters of increasing diameter;

DETAILED DESCRIPTION

Figure 1:
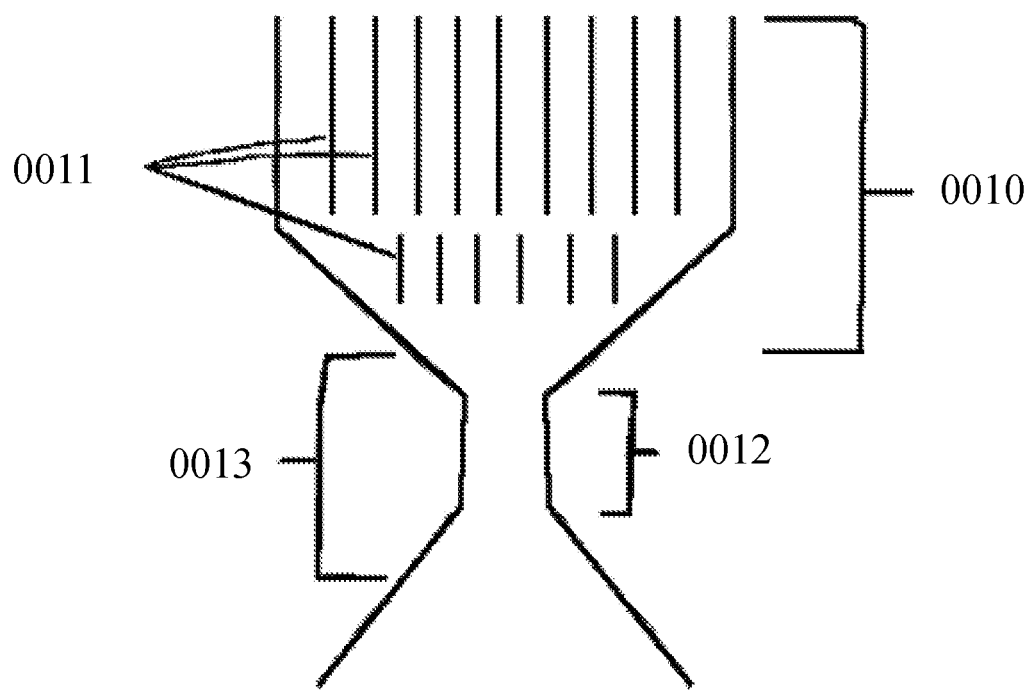
FIG. 1 is a schematic illustration of an example of a reactor.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed. It shall be understood that different aspects of the invention can be appreciated individually, collectively, or in combination with each other.

The present disclosure provides systems and methods for affecting chemical changes. Affecting such chemical changes may include making particles (e.g., carbon particles, such as, for example, carbon black) using the systems and methods of the present disclosure. While such particles may be described herein primarily in terms of or in the context of carbon particles, the particles of the present disclosure may include other types of particles. The systems and methods described herein may use electrical energy to affect chemical changes. The chemical changes may include making carbon particles (e.g., carbon black) with thermal transfer gas. Provided herein are systems and methods of making carbon particles (e.g., carbon black) with thermal transfer gas. For example, the carbon particles (e.g., carbon black) may be produced by heating the thermal transfer gas (e.g., to at least about 2,000° C.) and then contacting the thermal transfer gas with a reactive hydrocarbon feedstock gas to generate carbon particles (e.g., carbon black) and hydrogen gas. A Joule heater may be used for heating the thermal transfer gas to be mixed with the hydrocarbon. The thermal transfer gas may in some instances be heated in an oxygen free environment. Processes implemented with the aid of the systems and methods herein may be very promising from an ecological and efficiency perspective. For example, in the case of carbon black, the processes described herein may emit from about 5 to about 10 times less $CO_2$ than the incumbent furnace process.

The thermal transfer gas may mix with the hydrocarbon feedstock to produce carbon particles (e.g., carbon black). The processes described herein may provide rapid mixing of the thermal transfer gas with the reactive gas feedstock. The processes described herein may provide a high enough reaction temperature (e.g., greater than about 1,300° C. or 1,500° C.) to form high quality carbon particles (e.g., high quality carbon black). These steps/factors may allow, for example, a high surface area and high structure carbon black (e.g., such as may be necessary in performance driven applications such as, for example, tires) to be produced.

Carbon particles may comprise fine particles. A fine particle may be described as a particle that has at least one dimension that is less than 100 nm (nanometers). The carbon particles may comprise spherical and/or ellipsoidal fine carbon particles. Spherical or ellipsoidal particles may mean singular particles and may also mean a plurality of particles that are stuck together in a fashion analogous to that of a bunch of grapes or aciniform. Carbon black may be an example of this type of fine carbon particle. The carbon particles may comprise few layer graphenes (FLG), which may comprise particles that possess two or more layers of graphene and have a shape that is best described as flat or substantially flat. The carbon particles may be substantially in disk form. The carbon particles may comprise carbonaceous pigment. A carbon particle may include a carbon nanoparticle. A carbon nanoparticle may include any particle which is 90% or greater carbon, has a surface area greater than 5 $m^2/g$ (square meters per gram), and the volume equivalent sphere possesses a diameter of less than 1 micron (displacement of liquid is equivalent to a 1 micron sphere or less per particle). This may comprise many different shapes including disks, bowls, cones, aggregated disks, few layer graphene (FLG), ellipsoidal, aggregated ellipsoidal, spheres, and aggregated spheres (e.g. carbon black), as non-limiting examples. The carbon nanoparticles may also comprise a plurality of these particle shapes. At least 90% of the particles in any given sample of carbon nanoparticles on a number basis may fall within the confines of this definition of carbon nanoparticles.

The processes described herein may heat a thermal transfer gas to greater than about 2,000° C. and rapidly mix this thermal transfer gas with reactive hydrocarbon feedstock. In an example, about two-thirds (by volume) of the total mixed gas may be thermal transfer gas and about one-third (by volume) of the total mixed gas may be feedstock gas (e.g., methane). If temperatures of the thermal transfer gas are lower than about 1,800° C., production of high quality carbon particles (e.g., carbon black) may be compromised. This type of heating and the ability to mix in the reactor may advantageously be used, for example, in the field of manufacture of carbon black. The systems and methods described herein may decrease average gas to hot surface distance in order to maximize heat transfer to the gas as the operating window for the heaters described herein may in some instances be near the operable service life of the materials of construction which may require maximizing thermal energy of the transfer gas.

The thermal transfer gas may comprise at least about 60% hydrogen up to about 100% hydrogen (by volume) and may further comprise up to about 30% nitrogen, up to about 30% CO, up to about 30% $CH_4$, up to about 10% HCN, up to about 30% $C_2H_2$, and up to about 30% Ar. For example, the thermal transfer gas may be greater than about 60% hydrogen. Additionally, the thermal transfer gas may also comprise polycyclic aromatic hydrocarbons such as anthracene, naphthalene, coronene, pyrene, chrysene, fluorene, and the like. In addition, the thermal transfer gas may have benzene and toluene or similar monoaromatic hydrocarbon components present. For example, the thermal transfer gas may comprise greater than or equal to about 90% hydrogen, and about 0.2% nitrogen, about 1.0% CO, about 1.1% $CH_4$, about 0.1% HCN and about 0.1% $C_2H_2$. The thermal transfer gas may comprise greater than or equal to about 80% hydrogen and the remainder may comprise some mixture of the aforementioned gases, polycyclic aromatic hydrocarbons, monoaromatic hydrocarbons and other components. Thermal transfer gas such as oxygen, nitrogen, argon, helium, air, hydrogen, carbon monoxide, hydrocarbon (e.g. methane, ethane, unsaturated) etc. (used alone or in mixtures of two or more) may be used. The thermal transfer gas may comprise greater than or equal to about 50% hydrogen by volume. The thermal transfer gas may comprise, for example, oxygen, nitrogen, argon, helium, air, hydrogen, hydrocarbon (e.g. methane, ethane) etc. (used alone or in mixtures of two or more). The thermal transfer gas may comprise greater than about 70% $H_2$ by volume and may include at least one or more of the gases HCN, $CH_4$, $C_2H_4$, $C_2H_2$, CO, benzene or polyaromatic hydrocarbon (e.g., naphthalene and/or anthracene) at a level of at least about 1 ppm. The thermal transfer gas may have at least a subset of such compositions before, during and/or after heating.

The hydrocarbon feedstock may include any chemical with formula $C_nH_x$ or $C_nH_xO_y$, where n is an integer; x is between (i) 1 and 2n+2 or (ii) less than 1 for fuels such as coal, coal tar, pyrolysis fuel oils, and the like; and y is between 0 and n. The hydrocarbon feedstock may include, for example, simple hydrocarbons (e.g., methane, ethane, propane, butane, etc.), aromatic feedstocks (e.g., benzene, toluene, xylene, methyl naphthalene, pyrolysis fuel oil, coal tar, coal, heavy oil, oil, bio-oil, bio-diesel, other biologically derived hydrocarbons, and the like), unsaturated hydrocarbons (e.g., ethylene, acetylene, butadiene, styrene, and the like), oxygenated hydrocarbons (e.g., ethanol, methanol, propanol, phenol, ketones, ethers, esters, and the like), or any combination thereof. These examples are provided as non-limiting examples of acceptable hydrocarbon feedstocks which may further be combined and/or mixed with other components for manufacture. A hydrocarbon feedstock may refer to a feedstock in which the majority of the feedstock (e.g., more than about 50% by weight) is hydrocarbon in nature. The reactive hydrocarbon feedstock may comprise at least about 70% by weight methane, ethane, propane or mixtures thereof. The hydrocarbon feedstock may be natural gas. The hydrocarbon may be methane, ethane, or propane or mixtures thereof. In some examples, more than about 90% of the hydrocarbon feedstock may be converted into carbon particles (e.g., carbon black) on a weight percent carbon basis.

Plasma energy may be utilized to crack a hydrocarbon feedstock. For example, a plasma arc may be utilized (e.g., in the absence of oxygen) to crack a hydrocarbon feedstock, generating carbon particles (e.g., carbon black) and hydrogen as a result. In some implementations, the carbon particles may be produced (e.g., manufactured) in an oxygen free atmosphere. An oxygen free atmosphere may comprise, for example, less than about 5% oxygen by volume, less than about 3% oxygen (e.g., by volume), or less than about 1% oxygen (e.g., by volume).

In some instances, temperatures in the plasma in an electric arc based plasma process (e.g., generated with the aid of two electrodes and a DC power supply, or three electrodes and an AC power supply) may exceed 10,000° C. and/or thermal fluxes experienced locally around the plasma itself may exceed $10^5$ W/m K (watts per meter kelvin). Very few materials may survive these thermal environments. Additionally, the power supply for a large scale electric arc based plasma black plant may be exceedingly complex and/or difficult to design and operate.

A thermal transfer gas may be heated to plasma temperatures or close to suitable plasma temperatures via resistive or inductive heating techniques. This thermal transfer gas may then be mixed with a hydrocarbon feedstock in order to rapidly heat the hydrocarbon to cause thermal cracking and the resultant formation of carbon particles (e.g., carbon black) and hydrogen. The systems and methods described herein may allow, for example, high quality carbon particles (e.g., carbon black) to be manufactured through non-combustion and non-electric arc plasma methodologies. In some examples, the systems and methods herein may enable high surface area (e.g., greater than about 20 square meters per gram ($m^2/g$)) carbon black to be manufactured (e.g., on a commercial scale) via a substantially oxygen free (e.g., less than about 5% oxygen (by volume), or less than about 3% oxygen (e.g., by volume)) process.

Either resistive or inductive heating elements may be utilized to heat the thermal transfer gas. The heating may be supplied to the elements at a rate of, for example, greater than or equal to about 750 kW or 1,000 kW of power. The thermal transfer gas may be contacted with a reactive hydrocarbon feedstock gas (e.g., to generate carbon particles, such as, for example, carbon black) at a thermal transfer gas flowrate greater than or equal to about 500 $Nm^3/hr$ (normal cubic meter/hour). The thermal transfer gas may be contacted with a reactive hydrocarbon feedstock gas (e.g., to generate carbon particles, such as, for example, carbon black) at a hydrocarbon feedstock gas flowrate greater than or equal to about 675 $Nm^3/hr$.

Figure 10:
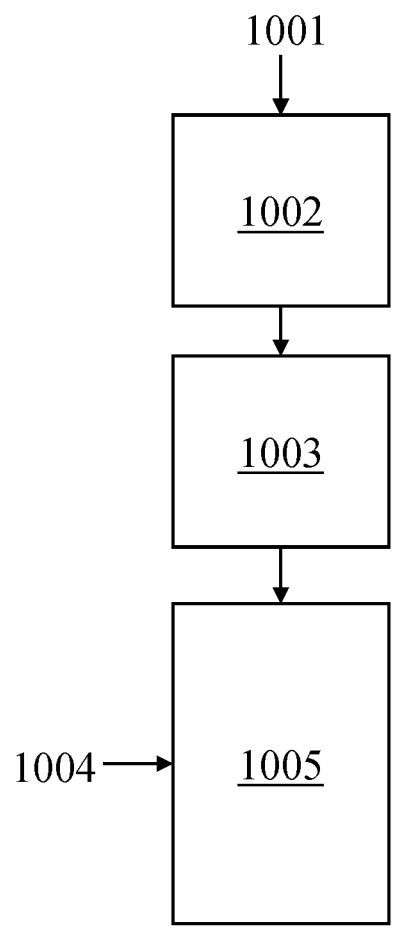
FIGS. 10 and 11 illustrate examples of combinations of heating methods.

FIG. 10 illustrates examples of combinations of heating methods in a process or method 1000. A thermal transfer gas (also "process gas" and "transfer gas" herein) 1001 may be heated at 1002 electrically (e.g., by Joule heating). For example, the thermal transfer gas may be heated at 1002 with a resistance heater, an induction heater or a combination thereof. The thermal transfer gas may be heated at 1003 with a plasma heater (which may be, for example, as described elsewhere herein). Hydrocarbon 1004 may be injected into a reactor 1005, where it may mix with the heated thermal transfer gas.

The hydrocarbon feedstock may be pre-heated (e.g., from a temperature of about 25° C.) to a temperature from about 100° C. to about 800° C. before coming into contact with the thermal transfer gas. The thermal transfer gas may be pre-heated prior to the heating (e.g., prior to the heating at 1002). See, for example, commonly assigned, co-pending Int. Pat. Publication No. WO 2017/034980 ("HIGH TEMPERATURE HEAT INTEGRATION METHOD OF MAKING CARBON BLACK"), which is entirely incorporated herein by reference.

Figure 11:
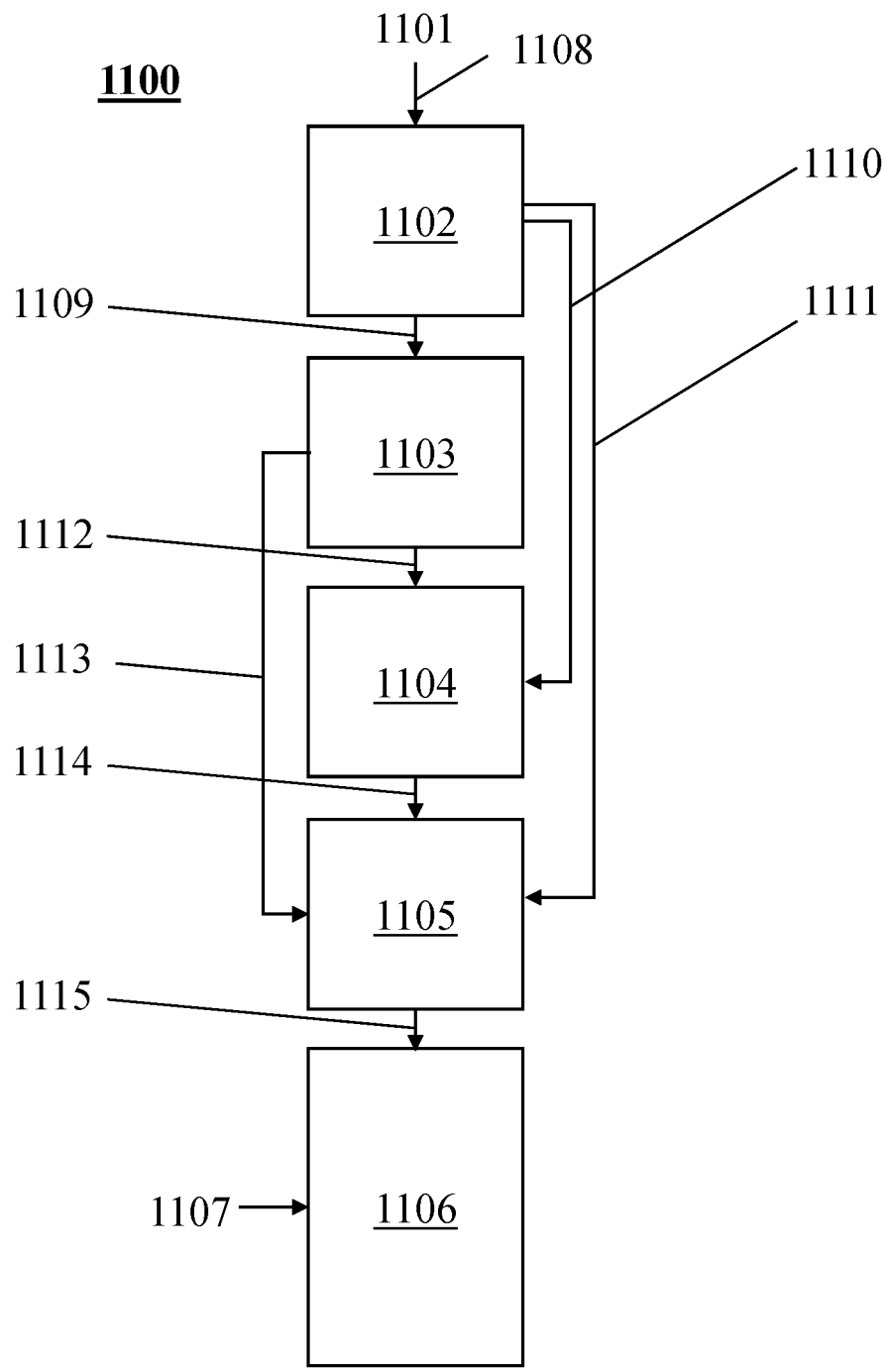

FIG. 11 illustrates examples of combinations of heating methods in a process or method 1100. A thermal transfer gas (also "process gas" and "transfer gas" herein) 1101 may be heated at 1102 (e.g., pre-heated by heat exchange in a heat exchanger). The thermal transfer gas may be heated at 1103 by heat exchange (e.g., with a combustion or nuclear process). The thermal transfer gas may be heated at 1104 electrically (e.g., by Joule heating). The thermal transfer gas may be heated at 1104 with a resistance heater, an induction heater or a combination thereof. The thermal transfer gas may be heated at 1105 with a plasma heater (which may be, for example, as described elsewhere herein). Hydrocarbon 1107 may be injected into a reactor 1106, where it may mix with the heated thermal transfer gas. Flows of the thermal transfer gas may include, for example, flows 1108, 1109, 1110, 1111, 1112, 1113, 1114, 1115, or subsets thereof. In an example, the thermal transfer gas may be heated at 1102, followed by heating 1104 or 1105.

Joule heating may be combined with other types of heaters (e.g., to achieve maximum heating with minimal capital cost or controls challenges). For example, electric arc based plasma heating may be used downstream of resistive or inductive heating elements to increase the temperature of the thermal transfer gas. In an example, a resistive heater may be placed upstream of an arc plasma heater. The resistive heater may be used to achieve gas temperatures of about 2,900-2,950° C., and then the plasma heater may increase temperature further. Such a combination may advantageously limit the size of the plasma heater and the exposure of material to the very high temperature, while also producing a very stable plasma arc due to the high temperature of the entering gas. In another example, an induction heater may be combined in series with an arc plasma heater. Joule heating may be used to get to temperatures that approach maximum temperature of the induction heater material (e.g., graphite), and then arc heating may be used to increase the temperature beyond that achievable with Joule heating. In yet another example, the thermal transfer gas may be heated with the aid of resistive heating, induction heating, electric arc based plasma heating, or any combination thereof.

The thermal transfer gas may be heated to and/or the feedstock may be subjected to a temperature of greater than or equal to about 1,000° C., 1,100° C., 1,200° C., 1,300° C., 1,400° C., 1,500° C., 1,600° C., 1,700° C., 1,800° C., 1,900° C., 2,000° C., 2050° C., 2,100° C., 2,150° C., 2,200° C., 2,250° C., 2,300° C., 2,350° C., 2,400° C., 2,450° C., 2,500° C., 2,550° C., 2,600° C., 2,650° C., 2,700° C., 2,750° C., 2,800° C., 2,850° C., 2,900° C., 2,950° C., 3,000° C., 3,050° C., 3,100° C., 3,150° C., 3,200° C., 3,250° C., 3,300° C., 3,350° C., 3,400° C. or 3,450° C. Alternatively, or in addition, the thermal transfer gas may be heated to and/or the feedstock may be subjected to a temperature of less than or equal to about 3,500° C., 3,450° C., 3,400° C., 3,350° C., 3,300° C., 3,250° C., 3,200° C., 3,150° C., 3,100° C., 3,050° C., 3,000° C., 2,950° C., 2,900° C., 2,850° C., 2,800° C., 2,750° C., 2,700° C., 2,650° C., 2,600° C., 2,550° C., 2,500° C., 2,450° C., 2,400° C., 2,350° C., 2,300° C., 2,250° C., 2,200° C., 2,150° C., 2,100° C., 2050° C., 2,000° C., 1,900° C., 1,800° C., 1,700° C., 1,600° C., 1,500° C., 1,400° C., 1,300° C., 1,200° C. or 1,100° C. The thermal transfer gas may be heated to such temperatures, for example, as described herein in relation to FIGS. 10 and 11. For example, the thermal transfer gas may be heated to such temperatures by a Joule heater (e.g., directly or indirectly), by a plasma heater, or a combination thereof.

The thermal transfer gas may be provided to the system (e.g., to a reactor) at a rate of, for example, greater than or equal to about 1 normal cubic meter/hour ($Nm^3/hr$), 2 $Nm^3/hr$, 5 $Nm^3/hr$, 10 $Nm^3/hr$, 25 $Nm^3/hr$, 50 $Nm^3/hr$, 75 $Nm^3/hr$, 100 $Nm^3/hr$, 150 $Nm^3/hr$, 200 $Nm^3/hr$, 250 $Nm^3/hr$, 300 $Nm^3/hr$, 350 $Nm^3/hr$, 400 $Nm^3/hr$, 450 $Nm^3/hr$, 500 $Nm^3/hr$, 550 $Nm^3/hr$, 600 $Nm^3/hr$, 650 $Nm^3/hr$, 700 $Nm^3/hr$, 750 $Nm^3/hr$, 800 $Nm^3/hr$, 850 $Nm^3/hr$, 900 $Nm^3/hr$, 950 $Nm^3/hr$, 1,000 $Nm^3/hr$, 2,000 $Nm^3/hr$, 3,000 $Nm^3/hr$, 4,000 $Nm^3/hr$, 5,000 $Nm^3/hr$, 6,000 $Nm^3/hr$, 7,000 $Nm^3/hr$, 8,000 $Nm^3/hr$, 9,000 $Nm^3/hr$, 10,000 $Nm^3/hr$, 12,000 $Nm^3/hr$, 14,000 $Nm^3/hr$, 16,000 $Nm^3/hr$, 18,000 $Nm^3/hr$, 20,000 $Nm^3/hr$, 30,000 $Nm^3/hr$, 40,000 $Nm^3/hr$, 50,000 $Nm^3/hr$, 60,000 $Nm^3/hr$, 70,000 $Nm^3/hr$, 80,000 $Nm^3/hr$, 90,000 $Nm^3/hr$ or 100,000 $Nm^3/hr$. Alternatively, or in addition, the thermal transfer gas may be provided to the system (e.g., to the reactor) at a rate of, for example, less than or equal to about 100,000 $Nm^3/hr$, 90,000 $Nm^3/hr$, 80,000 $Nm^3/hr$, 70,000 $Nm^3/hr$, 60,000 $Nm^3/hr$, 50,000 $Nm^3/hr$, 40,000 $Nm^3/hr$, 30,000 $Nm^3/hr$, 20,000 $Nm^3/hr$, 18,000 $Nm^3/hr$, 16,000 $Nm^3/hr$, 14,000 $Nm^3/hr$, 12,000 $Nm^3/hr$, 10,000 $Nm^3/hr$, 9,000 $Nm^3/hr$, 8,000 $Nm^3/hr$, 7,000 $Nm^3/hr$, 6,000 $Nm^3/hr$, 5,000 $Nm^3/hr$, 4,000 $Nm^3/hr$, 3,000 $Nm^3/hr$, 2,000 $Nm^3/hr$, 1,000 $Nm^3/hr$, 950 $Nm^3/hr$, 900 $Nm^3/hr$, 850 $Nm^3/hr$, 800 $Nm^3/hr$, 750 $Nm^3/hr$, 700 $Nm^3/hr$, 650 $Nm^3/hr$, 600 $Nm^3/hr$, 550 $Nm^3/hr$, 500 $Nm^3/hr$, 450 $Nm^3/hr$, 400 $Nm^3/hr$, 350 $Nm^3/hr$, 300 $Nm^3/hr$, 250 $Nm^3/hr$, 200 $Nm^3/hr$, 150 $Nm^3/hr$, 100 $Nm^3/hr$, 75 $Nm^3/hr$, 50 $Nm^3/hr$, 25 $Nm^3/hr$, 10

Nm³/hr, 5 Nm³/hr or 2 Nm³/hr. The thermal transfer gas may be provided to the system (e.g., to the reactor) at such rates in combination with one or more feedstock flow rates described herein. The thermal transfer gas may be heated at such flow rates to one or more temperatures described herein.

The feedstock (e.g., hydrocarbon) may be provided to the system (e.g., to a reactor) at a rate of, for example, greater than or equal to about 50 grams per hour (g/hr), 100 g/hr, 250 g/hr, 500 g/hr, 750 g/hr, 1 kilogram per hour (kg/hr), 2 kg/hr, 5 kg/hr, 10 kg/hr, 15 kg/hr, 20 kg/hr, 25 kg/hr, 30 kg/hr, 35 kg/hr, 40 kg/hr, 45 kg/hr, 50 kg/hr, 55 kg/hr, 60 kg/hr, 65 kg/hr, 70 kg/hr, 75 kg/hr, 80 kg/hr, 85 kg/hr, 90 kg/hr, 95 kg/hr, 100 kg/hr, 150 kg/hr, 200 kg/hr, 250 kg/hr, 300 kg/hr, 350 kg/hr, 400 kg/hr, 450 kg/hr, 500 kg/hr, 600 kg/hr, 700 kg/hr, 800 kg/hr, 900 kg/hr, 1,000 kg/hr, 1,100 kg/hr, 1,200 kg/hr, 1,300 kg/hr, 1,400 kg/hr, 1,500 kg/hr, 1,600 kg/hr, 1,700 kg/hr, 1,800 kg/hr, 1,900 kg/hr, 2,000 kg/hr, 2,100 kg/hr, 2,200 kg/hr, 2,300 kg/hr, 2,400 kg/hr, 2,500 kg/hr, 3,000 kg/hr, 3,500 kg/hr, 4,000 kg/hr, 4,500 kg/hr, 5,000 kg/hr, 6,000 kg/hr, 7,000 kg/hr, 8,000 kg/hr, 9,000 kg/hr or 10,000 kg/hr. Alternatively, or in addition, the feedstock (e.g., hydrocarbon) may be provided to the system (e.g., to the reactor) at a rate of, for example, less than or equal to about 10,000 kg/hr, 9,000 kg/hr, 8,000 kg/hr, 7,000 kg/hr, 6,000 kg/hr, 5,000 kg/hr, 4,500 kg/hr, 4,000 kg/hr, 3,500 kg/hr, 3,000 kg/hr, 2,500 kg/hr, 2,400 kg/hr, 2,300 kg/hr, 2,200 kg/hr, 2,100 kg/hr, 2,000 kg/hr, 1,900 kg/hr, 1,800 kg/hr, 1,700 kg/hr, 1,600 kg/hr, 1,500 kg/hr, 1,400 kg/hr, 1,300 kg/hr, 1,200 kg/hr, 1,100 kg/hr, 1,000 kg/hr, 900 kg/hr, 800 kg/hr, 700 kg/hr, 600 kg/hr, 500 kg/hr, 450 kg/hr, 400 kg/hr, 350 kg/hr, 300 kg/hr, 250 kg/hr, 200 kg/hr, 150 kg/hr, 100 kg/hr, 95 kg/hr, 90 kg/hr, 85 kg/hr, 80 kg/hr, 75 kg/hr, 70 kg/hr, 65 kg/hr, 60 kg/hr, 55 kg/hr, 50 kg/hr, 45 kg/hr, 40 kg/hr, 35 kg/hr, 30 kg/hr, 25 kg/hr, 20 kg/hr, 15 kg/hr, 10 kg/hr, 5 kg/hr, 2 kg/hr, 1 kg/hr, 750 g/hr, 500 g/hr, 250 g/hr or 100 g/hr.

In comparison to electric arc plasma power supplies, resistive or inductive heating power supplies may be very simple to construct and use with the ability to utilize standard voltage AC power as well as rectified DC voltage. Graphite may be used as material of construction due to, for example, its corrosion resistance, relatively flat temperature-dependent resistivity curve, materials cost, electrical loading capability at temperature, robustness at very high temperature, high emissivity of radiation, or any combination thereof. Other materials may also be used, particularly in lower temperature regions of a Joule heating system (e.g., in combination with graphite). These materials may include, for example, silicon carbide, tungsten, other refractory metals or high temperature metals used in Joule heating systems.

Figure 12:
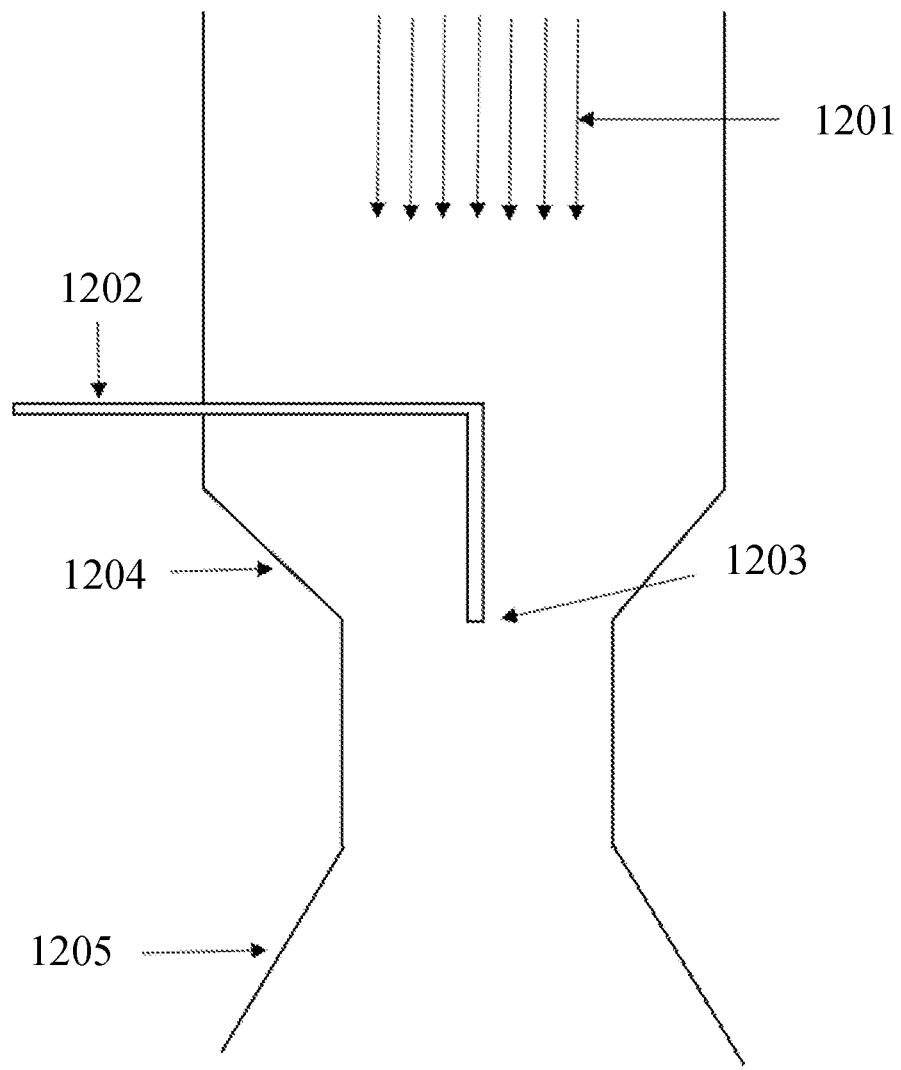
FIG. 12 is a schematic illustration of an example of another reactor.

FIG. 12 shows a cross-section of a part of a reactor. In this example, thermal transfer gas 1201 may be generated in an upper portion of the reactor either through the use of three or more AC electrodes, through the use of concentric DC electrodes, or through the use of a resistive or inductive heater. The thermal transfer gas may comprise at least about 50% hydrogen by volume that is at least about 2,400° C. A hydrocarbon injector 1202 may be cooled and may enter from the side of the reactor and then turn into an axial position with respect to the thermal transfer gas flow. A hydrocarbon injector tip 1203 may be one opening or a plurality of openings that may inject hydrocarbons in clockwise or counter clockwise flow patterns to optimize mixing. Converging regions 1204 may lead to a narrowing of the reactor and then diverging regions 1205 downstream of the converging region. See, for example, commonly assigned, co-pending Int. Pat. Pub. Nos. WO 2017/044594 ("CIRCULAR FEW LAYER GRAPHENE"), WO 2017/048621 ("CARBON BLACK FROM NATURAL GAS"), WO 2017/190045 ("SECONDARY HEAT ADDITION TO PARTICLE PRODUCTION PROCESS AND APPARATUS") and WO 2017/190015 ("TORCH STINGER METHOD AND APPARATUS"), each of which is entirely incorporated herein by reference.

FIG. 1 shows a cross-section of a part of another reactor. The reactor may be separated into two sections or zones, a thermal activation zone 0010 and a reactor zone 0013, with natural gas or other feedstock injection taking place in the area in-between. A top region 0010 may comprise a thermal activation zone (where the thermal transfer gas is heated up) in a configuration with mounting tubes 0011. The mounting tubes may act as resistive elements or house resistive elements. The resistive elements may heat the thermal transfer gas. The mounting tubes may comprise structures holding the elements. The thermal transfer gas (e.g., which may be heated up to about 3,000° C.) may mix rapidly with the reactive gas (feedstock). The rapid mixing of the thermal transfer gas with the reactive gas may reduce or eliminate inhomogeneity in the finished product (e.g., carbon black) that may occur if the reactive gas is heated to high temperatures directly. A middle region 0012 may comprise a throat. The hydrocarbon may enter the reactor and mix with the thermal transfer gas in an injection zone 0013. The injection zone 0013 may comprise or encompass the throat and some additional space upstream and downstream of the throat. The reactor may comprise a reaction zone that includes any area in the reactor past the point of the injection of the hydrocarbon feedstock.

The throat 0012 may separate the two regions and/or accelerate the thermal transfer gas so that more intense mixing can take place in a smaller region. The throat may be defined as the narrowest section between the thermal activation zone and the reactor zone. The length of the throat may be several meters or as small as about 0.5 to about 2 millimeters. The narrowest point of the throat may be defined as the narrowest diameter of the throat +20%. Any cross-section that is within about 10% of the narrowest cross-section may be deemed to be within the scope of the throat. One diameter may be defined as the diameter of the throat at the narrowest point of the throat. Hydrocarbon injection points into the reactor may be positioned from about 5 diameters upstream of the throat to about 5 diameters downstream of the throat. The injection may occur within about +/−2 diameters or about +/−1 diameter of the throat. Injection of hydrocarbon feedstock may occur, for example, radially outwards from a centrally located injector or radially inwards from the wall of the reactor vessel. The injector(s) may be cooled via a cooling liquid (e.g., water). The injector may be fabricated from suitable materials such as, for example, copper, stainless steel, graphite and other similar materials with high melting points and good corrosion resistance (e.g., to hydrogen free radical environment). While the reactor as shown in FIG. 1 has a vertical orientation with downward flow, an upward flow or a horizontal reactor orientation may also be used.

FIGS. 2A and 2B (which are rotated by 90 degrees around a vertical axis relative to each other) show an example of a mounting tube 0025 containing heating elements used to heat the thermal transfer gas. The mounting tube 0025 may be filled with resistively heated plates 0022 and the plates may be connected to an electrical power supply that provides electricity to heat the plates. The mounting tube 0025 may comprise an inner lining 0024. The inner lining 0024 of the mounting tube may be filled with graphite felt or some other thermally and/or electrically insulating material.

Electrical connections 0020 may be provided for heating the element. The flow of thermal transfer gas (indicated by arrow 0021) may be along the element material or heating plates 0022 (which is a type of element). A ceramic plate 0023 may be provided at the connections 0020 to serve as both a thermal and electrical insulator and as the mounting surface for the plates. Thermally and/or electrically insulating material 0024 (e.g., graphite felt, packed silica aerogel, high temperature ceramic materials, or similar materials) may be packed along the sides of the elements and the mounting tube 0025 (e.g., which may provide for more efficient heat transfer). The mounting tube and/or the elements may be made from materials such as, for example, graphite. Sufficient heat may be transferred to the feedstock to form high quality carbon particles (e.g., carbon black). Once the feedstock has been injected, at least some of the heat transfer to bring the two gases to an equilibrium (e.g., thermal equilibrium) may occur within less than or equal to about 2 seconds. In an example, from about 30% to about 80%, or from about 40% to about 70% of the heat contained in the heated thermal transfer gas may be transferred to the hydrocarbon feedstock within about 2 seconds of initial exposure to the thermal transfer gas. In another example, more than about 60% of the heat contained in the heated thermal transfer gas may be transferred to the hydrocarbon feedstock within about 2 seconds of initial exposure to the thermal transfer gas.

The element(s) may be arranged as a series of plates (e.g., as shown in FIGS. 2A and 2B) filled into a graphite tube. A plate may be a rectangular or square shaped plate. The plate may have a design or pattern cut into the plate to, for example, decrease or minimize resistance at the furthest downstream point on the plate. Variable resistance may be used to reduce heat flux at higher temperatures (e.g., downstream) to protect the element(s). In FIG. 2B, the cuts into the plate may create a meandering pathway that may provide a larger effective cross-sectional area at the bottom or furthest downstream section (e.g., bottom section) of the plate. The cuts may be made completely through the plate (e.g., the cuts may extend through the thickness of the plate). The plates may be spaced from each other at a distance or gap sufficient to prevent arcing across the gap. The cuts may allow tuning of the resistance and thus temperature. The cuts may (e.g., also) reduce stress related to thermal expansion. For example, the plate may have a design or pattern cut into the plate that allows for thermal stress relief. The heating plate may have a grain structure to limit temperature induced erosion or sublimation at plate temperatures up to, for example, about 3,000° C.

With continued reference to FIGS. 2A and 2B, flow of thermal transfer gas may be directed through a top of the tube (e.g., mounting tube) and over the surface of the plate (e.g., over the surface of each tube). The thickness of the plate may increase in a downstream direction (e.g., the plate may become thicker toward the downstream portion of the plate). This may further exaggerate the large cross-sectional area at the bottom of the plate and enable a temperature gradient along the body and surface of the plate.

Plates may be connected to each other in parallel (e.g., see FIGS. 8A and B), in series, or a combination thereof. The plates may constitute several independent circuits. For example, one tube (e.g., mounting tube) of plates may comprise four or more plates arranged as one circuit. A reactor may comprise one or more (e.g., several) tubes. A tube (e.g., a mounting tube) may have, for example, a length from about 0.5 meter to about 5 meters, and a diameter of about 1 meter. Several sets of tubes (e.g., at least 2, 3, 4, 5, 10, 15, 20 or more mounting tubes) may be set up one on top of the other (e.g., to stage the heating of the thermal transfer gas) and/or be installed in parallel (e.g., for providing heat to the reactor). The mounting tubes may be connected electrically in series to one another, in parallel to one another, or a combination thereof.

Another example includes the use of tubes as elements. The tubes may (e.g., also) be nested in an outer sheathing. An outer sheathing or mounting tube described herein may be cylindrical, oval, polygonal (e.g., rectangular or square), curved or irregular in shape. The outer sheathing or mounting tube may be shaped to increase the efficiency of use of space. In an example, the outer sheathing or mounting tube in all embodiments may be cylindrical in shape or may be rectangular in shape (e.g., so that the most efficient use of space can be achieved). For example, tubes may be mounted in such a way that the tubes may be used as elements (e.g., as shown in FIGS. 3A and 3B). These elements may be, for example: hollow or solid; cylindrical or rectangular in shape (in cross-section); geometrically star shaped with a variety of possibilities for the star shape (3 pointed, 4 pointed, 5 pointed, etc.); or oval, polygonal, curved or irregular in shape. Any description of an outer sheathing herein may equally apply to a mounting tube at least in some configurations, and vice versa. An outer sheathing may be a mounting tube, and vice versa.

FIGS. 3A and 3B show another example of a resistive heater (also "resistance heater" herein). The heater consists of a series of tube shaped elements 0031. Thermal transfer gas may flow, for example, axially (e.g., as gas flows 1 and 2) or radially through the tubes (e.g., the gas may flow along the length of the elements, or enter and exit through the sides of the elements). Element connectors (e.g., graphite connectors) at the top and bottom of the tubes may allow electrical current to flow through the elements to generate resistive heat. An electrically insulating plate (e.g., a ceramic) may separate the element tubes and hold them in place.

The tubes in FIGS. 3A and 3B may be interconnected (e.g., connected at the top and the bottom of the tube) to form one resistive circuit (e.g., a series circuit) within one mounting tube. Multiple circuits may also be used within each mounting tube. For example, all of the element tubes may be connected to create one circuit, or subsets of the tubes may be connected to create multiple circuits. A mounting tube may have, for example, a length from about 0.5 meters to about 5 meters, and a diameter of about 1 meter. Additionally, the elements need not be contained in a mounting tube but can instead be free standing.

Figure 4:
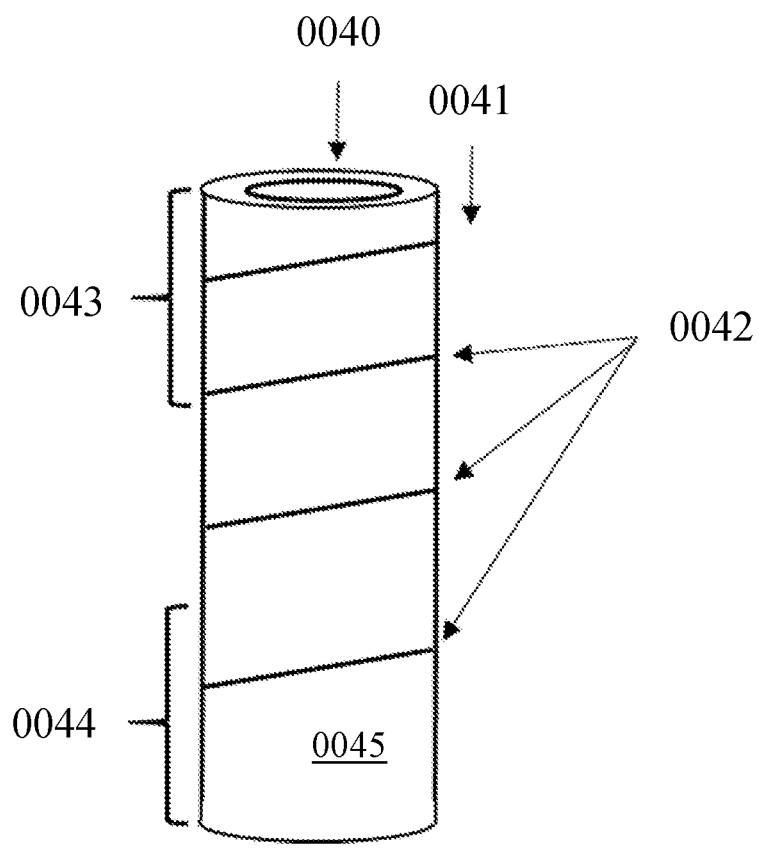
FIGS. 4 and 5 show examples of spiral cut elements/tubes.

FIG. 4 shows an example of an element 0045 (e.g., element 0031 in FIGS. 3A and 3B). Thermal transfer gas may flow through (indicated by 0040) and around (indicated by 0041) the element 0045. In this example, grooves 0042 of gradually increasing spacing may be cut into the element in a direction from top to bottom to create a spring-like appearance. As a result of the spiral groove, initial resistance at the top of the element 0043 may be greater than final resistance at the bottom of the element 0044, creating a decreasing resistance gradient from top to bottom. This gradient may aid in keeping the resistive element temperature low even as thermal transfer gas temperature increases along its length by reducing heat flux into the hotter gas. This may be achieved by controlling the spiral cut such that the cross-sectional area at the bottom is greater than the cross-sectional area at the top. In this example, the elements are connected to a thermally and electrically insulating plate.

The insulating plate may comprise or be coupled to an electrical connection to a power supply. The element in FIG. 4 may or may not comprise (e.g., may be made with or without) cutout grooves. The element may be configured, for example, in a nested concentric tube configuration where some or all of the elements have grooves and/or some or all elements do not have grooves. For example, with nested elements (e.g., from top to bottom), the outer diameter for a 1,000 kW (kilowatt) heater may increase from about 0.075 meter to about 0.35 meter for 12 tubes. A plurality of nested tubes may be configured such that the nested tubes are stacked vertically and/or arranged in a horizontal configuration.

In a configuration where the holder of the tube is positioned at the top of the tube with very little or no support at the bottom of the tube, the tube may deflect (e.g., due to off axis stress distribution) into a high stress position. This may decrease the lifetime of such parts (e.g., resulting in increased downtime and increased production costs of, for example, carbon black). To mitigate such effects (e.g., stress creation created through the spiral cut introduced to the tube element), another spiral may be cut, for example, 180 degrees to the first spiral (e.g., at an angle of 180 degrees with respect to the first spiral). This may be performed also on an outer or inner tube to the first tube that is electrically connected to the first tube.

Figure 5:
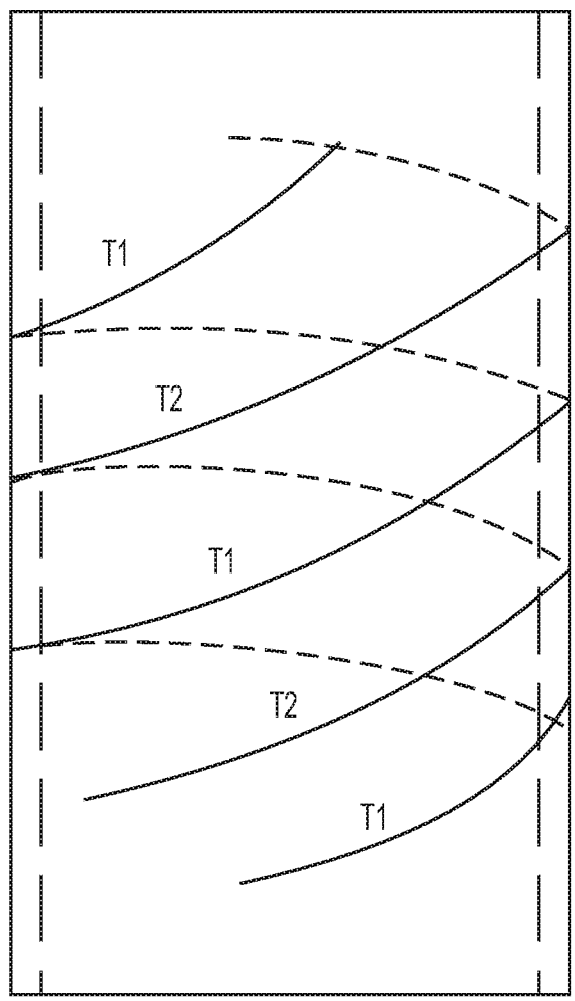

FIG. 5 shows two spiral paths (e.g., formed between two spiral cuts $T_1$ and $T_2$), but any number of spiral paths may be cut (e.g., spaced evenly around the axis). With multiple spiral paths cut, current may be directed in parallel through the paths formed by $T_1$ and $T_2$. The cross-sectional area of the paths may be configured to create the desired heat flux with the parallel current flow.

Figure 6B:
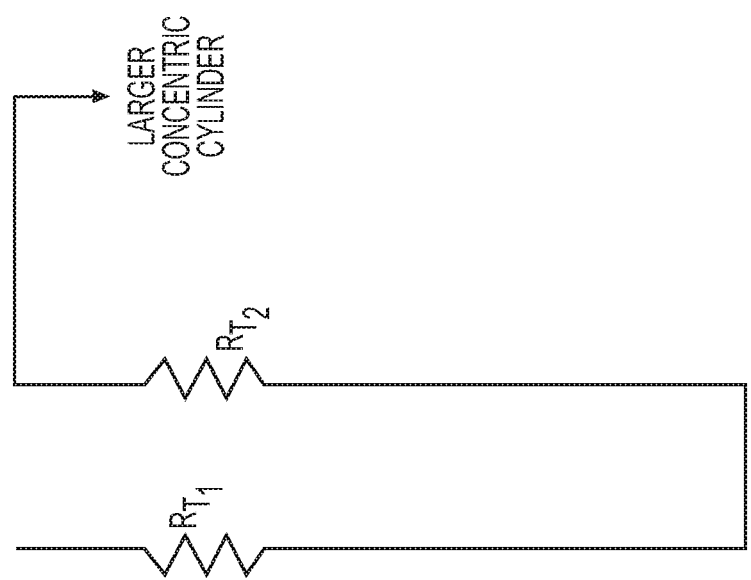
FIG. 6B is an electrical schematic showing examples of a relationship of $T_1$ and $T_2$ in FIG. 6A and incorporation into a larger concentric system.
Figure 6A:
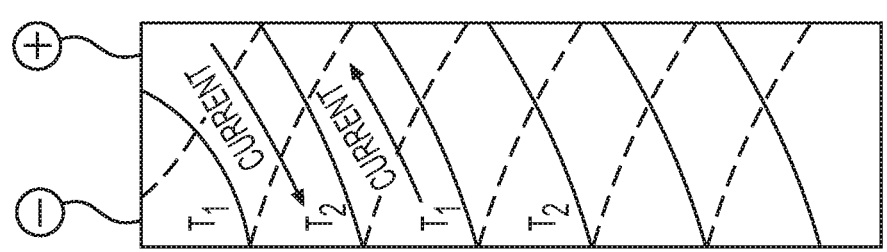
FIG. 6A shows another example of a spiral cut element/tube.

Flow of current may also (e.g., alternatively, or in addition) be directed in series in one individual tube (which may be a hollow element, as opposed to a casing containing a bundle of elements) with two, four, or more even number of spiral cuts (e.g., at least 2, 4, 6, 8, 10 or 12 spiral cuts), as shown, for example, in FIG. 6A.

FIG. 6A shows an example of a spiral cut element/tube with the two spiral cuts $T_1$ and $T_2$ continuing all the way to a top edge of the element/tube, creating electrical separation of the two paths created between the cuts. Current may, for example, flow down the $T_1$ path and then back up the $T_2$ path, as shown, or vice versa. The element may be connected in series to another concentrically oriented tube or hollow element. Such a configuration may advantageously avoid making any electrical connections at a hot end (e.g., a bottom edge) of a heater (e.g., a nested tube heater).

FIG. 6B is an electrical schematic showing resistance of the $T_1$ and $T_2$ paths in the spiral cut element/tube in FIG. 6A. FIG. 6B also provides an example of incorporation of the spiral cut element/tube in FIG. 6A into a larger concentric system (e.g., a larger concentric cylinder or nested tube).

FIGS. 7A, 7B and 7C show 3 spiral tube heaters of increasing diameter. With concentrically arranged spiral tube heaters, a constant spiral pitch may lead to non-uniform heating. As diameter D increases (e.g., $D_1<D_2<D_3$), a constant spiral pitch h may result in larger and larger strip width b, resulting in lower heat flux in the larger diameter spiral tube heaters. The strip width b may be held constant (e.g., $b_1=b_2=b_3$) by varying the spiral pitch h (e.g., $h_1>h_2>h_3$) relative to the diameter of the tube. The strip width b may be held constant while varying the spiral pitch h relative to the diameter of the tube using, for example, the function given in FIGS. 7A, 7B and 7C (top right). In this manner, heat flux into the flowing gas at any given height may be held constant across the multiple tubes.

Spiral pitch may be varied down the length of the heaters described herein (e.g., similar to the spiral tube heater described above) to achieve higher and/or lower local heat fluxes. This may allow use of a higher heat flux at the cold end of the element, taking advantage of cooler gas entering the heater, and a lower heat flux at the hot end of the element to reduce the temperature difference between the gas and the element as the elements approach their service temperature limit. The relationship between spiral pitch and tube diameter may be used for varying diameters and varying fluxes.

Figure 8B:
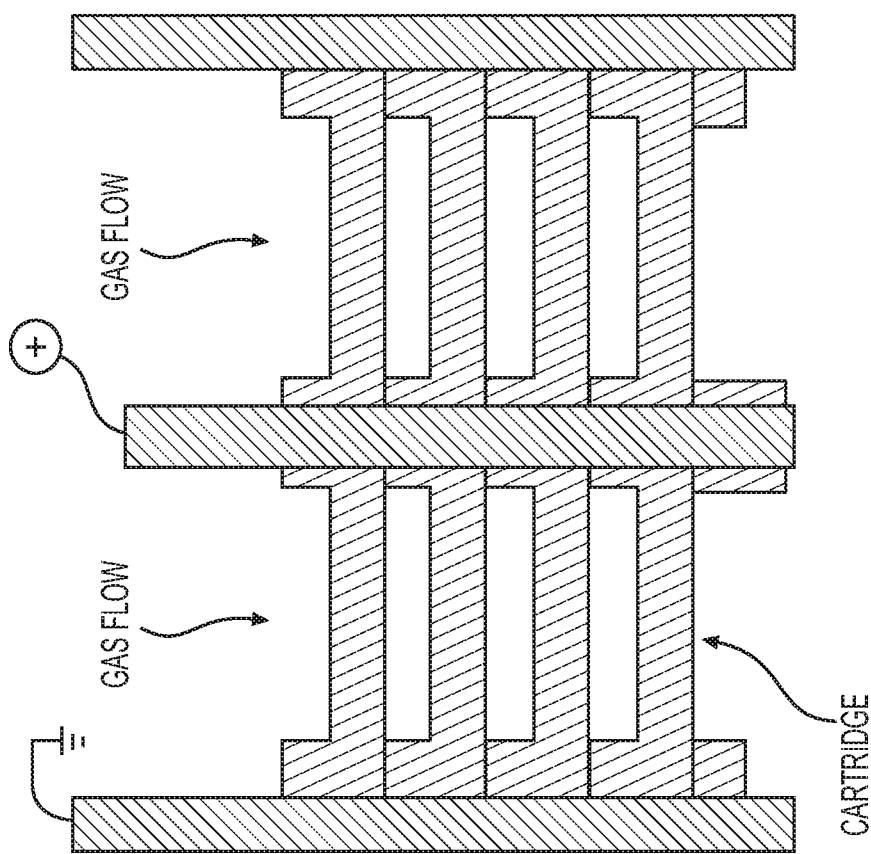
FIG. 8B is an example of a cartridge assembly tube.
Figure 8A:
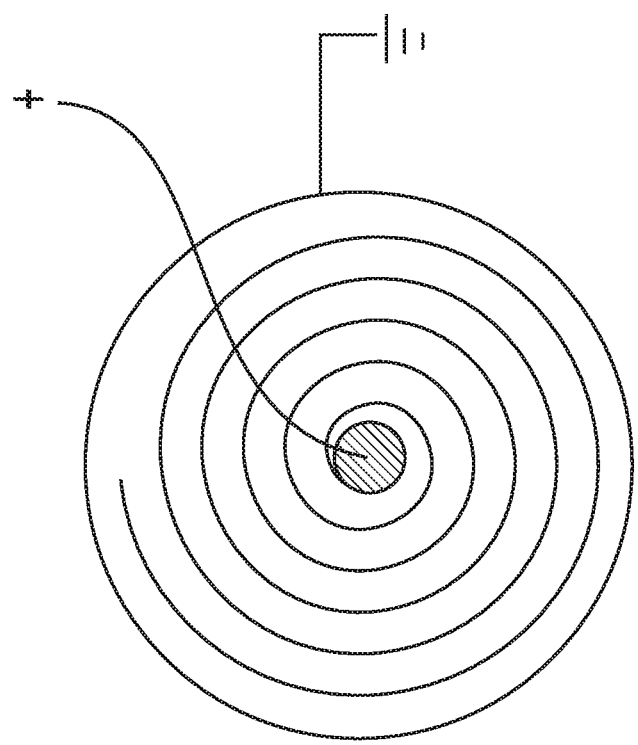
FIG. 8A is an example of a spiral wound element.

FIGS. 8A and 8B show an example of a parallel heating system. The system may comprise, for example, at least 2, 3, 4, 5, 6, 7, 8, 9, 10, 12, 14, 16, 18, 20, 25, 30, 40, 50, 75 or 100 cartridges. A cartridge may be an element. The cartridges may be placed between two poles of opposite charge. A failure in one of the parallel cartridges may not disable the entire system (e.g., the system may advantageously provide redundancy).

In the example shown in FIGS. 8A and 8B, each cartridge is a flat plate with a spiral cut going from the middle to the outside, where the middle of the plate is connected to one pole, in this case positive, and the outside of the plate is connected to the other pole, in this case ground. The different cartridges may be linked together and connected to respective terminals (e.g., positive and ground terminals), for example, with threaded parts, as shown in FIG. 8B. The materials of construction (e.g., of the cartridges) may be, for example, graphite, silicon carbide, tungsten, or other high temperature metal or conductive material. The thickness of the spiral cartridge and the width of each spiral cut, along with the outside diameter of the cartridge, may determine the full circuit length and resistance for each cartridge, and these may then be assembled in parallel to gain the target resistance for a parallel current resistive heating system.

As described in greater detail elsewhere herein, Joule heating systems of the present disclosure may comprise one or more (e.g., a plurality) of heating elements. The system may comprise, for example, at least 1, 2, 3, 4, 5, 6, 7, 8, 9, 10, 12, 14, 16, 18, 20, 25, 30, 40, 50, 75 or 100 elements. In an example, the system comprises at least 5 elements.

Figure 9:
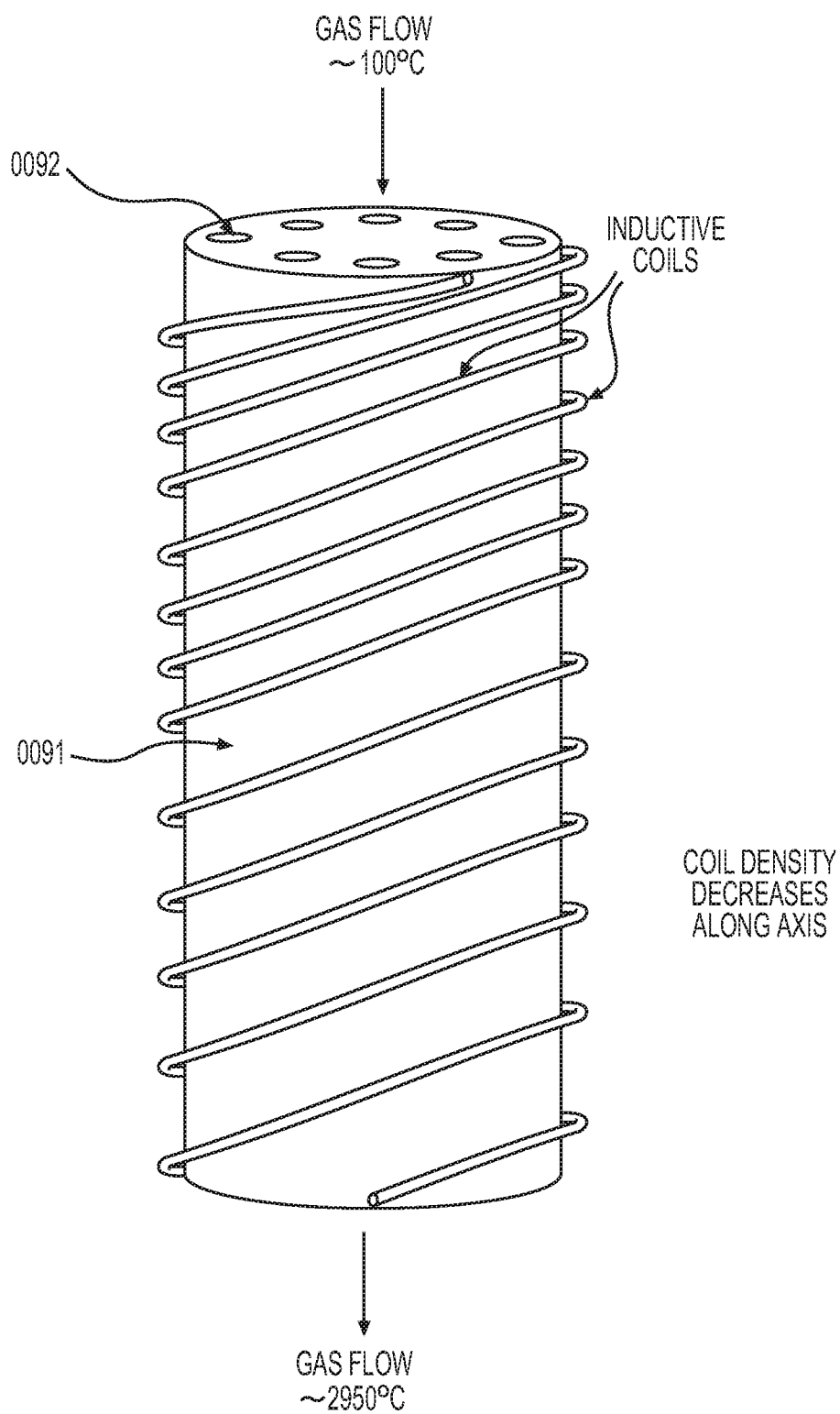
FIG. 9 is an example of an inductive heating element.

FIG. 9 shows a schematic of an inductive heating element for heating thermal transfer gas. In this type of heating, a conductive susceptor material 0091 may be used. A high frequency varying AC current may be applied to a cooled coil (e.g., inductive coils) wrapped around it, which sends current up and down the susceptor and heats via Joule heating. The inductive heater may comprise, for example, a cooled metal (e.g., copper) coil and a susceptor (e.g., graphite). In an example, the susceptor may be graphite and the coil may comprise water-cooled copper wound in a spiral fashion around the susceptor. The susceptor may be substantially porous and/or comprise one or more holes 0092 that may allow thermal transfer gas to pass through the susceptor. The density (e.g., winding density) of the copper coil may be varied down the length of the susceptor (e.g., graphite). Magnetic field and heating current may be reduced where the coil is less dense. The coil density (e.g., number of coils per unit length) of the copper coil may be varied down the length of the susceptor to reduce heat flux into hotter regions of the gas and thus manage the temperature of the susceptor material. Variable pitch inductance coil(s) may be used to vary watt loading along (e.g., down the length of) the susceptor (e.g., to vary the magnetic field). Variable thickness of the element (e.g., variable wall thickness of the susceptor) may be used to vary heat flux along the susceptor. For example, the thickness of the plate may increase in a downstream direction.

The advantages of using an induction heater (also "inductive heater" herein) may include, for example, that no electrical connection to the heating element is required and/or that coil current may be adjusted if the susceptor begins to wear and resistance changes.

In another example, heating plates may be arranged transverse to gas flow. The heating plates may be configured such that the resistance decreases down the length of the gas flow (e.g., decreasing resistance in the direction of the gas flow).

It can easily be seen that the elements of this invention may take a variety of shapes and configurations. The elements may be stacked closely together with enough gap to prevent arcing across the gap but to allow gas flow between each plate. For instance, the gap sizes may be from about 10 mm to about 500 mm. The assembly of elements may have an insulated duct pathway for the gas to flow across the elements (e.g., plates). The connection end of the assembly may alternate between a graphite or other conductive connector and a ceramic insulator to get the proper current flow path. Current flow through the elements (e.g., plates) may be, for example, entirely in series, or in parallel through the first two, three or more elements and then in series between each group, depending on desired voltage and current properties. The heating system may be scalable for different power levels and gas flows, for example, simply by adding elements or adding width or length to each plate. In an example of a 750 kW heater, approximately 18 plates of about 5 millimeter (mm) thickness, about 0.3 meter (m) width and about 1.25 m length may heat (e.g., suffice to heat) greater than or equal to about 0.0104 kg/s (kilograms per second) of hydrogen from about 100° C. to about 2,900° C. while staying below the maximum watt loading curves of graphite. Parallel heating systems with easily replaceable high temperature components (e.g., parallel resistive heater(s)) may advantageously be used in some implementations.

Joule heating systems of the present disclosure may operate at suitable powers. The power may be, for example, greater than or equal to about 0.5 kilowatt (kW), 1 kW, 1.5 kW, 2 kW, 5 kW, 10 kW, 25 kW, 50 kW, 75 kW, 100 kW, 150 kW, 200 kW, 250 kW, 300 kW, 350 kW, 400 kW, 450 kW, 500 kW, 550 kW, 600 kW, 650 kW, 700 kW, 750 kW, 800 kW, 850 kW, 900 kW, 950 kW, 1 megawatt (MW), 1.05 MW, 1.1 MW, 1.15 MW, 1.2 MW, 1.25 MW, 1.3 MW, 1.35 MW, 1.4 MW, 1.45 MW, 1.5 MW, 1.6 MW, 1.7 MW, 1.8 MW, 1.9 MW, 2 MW, 2.5 MW, 3 MW, 3.5 MW, 4 MW, 4.5 MW, 5 MW, 5.5 MW, 6 MW, 6.5 MW, 7 MW, 7.5 MW, 8 MW, 8.5 MW, 9 MW, 9.5 MW, 10 MW, 10.5 MW, 11 MW, 11.5 MW, 12 MW, 12.5 MW, 13 MW, 13.5 MW, 14 MW, 14.5 MW, 15 MW, 16 MW, 17 MW, 18 MW, 19 MW, 20 MW, 25 MW, 30 MW, 35 MW, 40 MW, 45 MW, 50 MW, 55 MW, 60 MW, 65 MW, 70 MW, 75 MW, 80 MW, 85 MW, 90 MW, 95 MW or 100 MW. Alternatively, or in addition, the power may be, for example, less than or equal to about 100 MW, 95 MW, 90 MW, 85 MW, 80 MW, 75 MW, 70 MW, 65 MW, 60 MW, 55 MW, 50 MW, 45 MW, 40 MW, 35 MW, 30 MW, 25 MW, 20 MW, 19 MW, 18 MW, 17 MW, 16 MW, 15 MW, 14.5 MW, 14 MW, 13.5 MW, 13 MW, 12.5 MW, 12 MW, 11.5 MW, 11 MW, 10.5 MW, 10 MW, 9.5 MW, 9 MW, 8.5 MW, 8 MW, 7.5 MW, 7 MW, 6.5 MW, 6 MW, 5.5 MW, 5 MW, 4.5 MW, 4 MW, 3.5 MW, 3 MW, 2.5 MW, 2 MW, 1.9 MW, 1.8 MW, 1.7 MW, 1.6 MW, 1.5 MW, 1.45 MW, 1.4 MW, 1.35 MW, 1.3 MW, 1.25 MW, 1.2 MW, 1.15 MW, 1.1 MW, 1.05 MW, 1 MW, 950 kW, 900 kW, 850 kW, 800 kW, 750 kW, 700 kW, 650 kW, 600 kW, 550 kW, 500 kW, 450 kW, 400 kW, 350 kW, 300 kW, 250 kW, 200 kW, 150 kW, 100 kW, 75 kW, 50 kW, 25 kW, 10 kW, 5 kW, 2 kW, 1.5 kW or 1 kW.

The heaters described herein may use, for example, hydrogen (or a hydrogen-rich gas) as the thermal transfer gas. This may require special materials of construction and/or unique functionality of element design. Hydrogen can be very efficient at transferring heat and this property may enable the thermal transfer gas to get to within, for example, about 100° C. of the temperature of the element. This may be important when considering that temperatures of the elements described herein can reach up to, for example, about 3,000° C. Graphite may achieve these temperatures and withstand hydrogen free radical corrosion.

Joule heating systems of the present disclosure may heat the thermal transfer gas to within, for example, about 1,000° C., 950° C., 900° C., 850° C., 800° C., 750° C., 700° C., 650° C., 600° C., 550° C., 500° C., 450° C., 400° C., 350° C., 300° C., 250° C., 200° C., 150° C., 100° C., 90° C., 80° C., 70° C., 60° C., 50° C., 40° C., 30° C., 20° C., 10° C. or 5° C. of the temperature of the element.

In addition to, or instead of (e.g., rather than), heating the thermal transfer gas directly, an element of the present disclosure may heat the thermal transfer gas indirectly by heating (e.g., by radiation) a material disposed between the element and the thermal transfer gas, and the material disposed between the element and the thermal transfer gas may in turn heat (e.g., by convection) the thermal transfer gas. The thermal transfer gas may not contact the element. For example, the thermal transfer gas may be indirectly heated with resistance heating (e.g., using a resistive heating element/resistance heater). Such a heater may be provided in a region or space that is separate from the thermal transfer gas (e.g., the thermal transfer gas may be provided in a separate region or space from the one or more heaters). The thermal transfer gas and the heater may have separate boundaries. The present disclosure provides systems and methods of heating the thermal transfer gas with the aid of (or by) Joule heating either directly (e.g., where the thermal transfer gas may contact the element) or indirectly (e.g., where the thermal transfer gas may not contact the element).

The element that heats the material (disposed between the element and the thermal transfer gas) may be, for example, a plate, a tube, a cylinder, a block, a rod, a coil or any other suitable shape (e.g., the element may be as described elsewhere herein). The element may be solid, hollow or a combination thereof. The material heated by the element may be disposed adjacent to the element. The element may be provided, for example, within a cavity, tube, duct, slot, slit, channel or other space or region in the material. The element may be maintained in an inert atmosphere (e.g., comprising argon, helium, nitrogen and/or other non-reactive gas(es)). Alternatively, an inert atmosphere (e.g., inert gas) may not be provided. The element may be maintained in a pressurized (e.g., at a gauge (above atmospheric) pressure greater than or equal to zero) atmosphere (e.g., pressurized inert atmosphere). A positive pressure may reduce sublimation and/or provide other benefits. The thermal transfer gas may be provided, for example, within a cavity, tube, duct, slot, slit, channel or other space or region in the material separated from (e.g., not in fluid communication with) any space or region containing the element. The pressure in the space or region containing the element and the pressure in the space or region containing the thermal transfer gas may be monitored (e.g., to ensure that there is no fluid exchange between them). The material may be, for example, a solid block or body. A cavity, tube, duct, slot, slit, channel or other space or region (e.g., such as the aforementioned spaces or regions containing the element or the thermal transfer gas) may be, for example, drilled, carved or otherwise formed in (or within) the material. Alternatively, or in addition, the element may be provided, for example, adjacent to a tube, duct, slot, slit, channel or other suitable shape (e.g., a free-standing shape) formed from the material. The element and the material may be, for example, enclosed in a larger cavity, tube, duct, slot, slit, channel or container (e.g., which may be formed from the same material). The thermal transfer gas may contact the material disposed between the element and the thermal transfer gas. The thermal transfer gas may, for example, flow through the material (e.g., through a cavity, tube, duct, slot, slit, channel or other space or region in the material). The element may be provided by itself, or enclosed in, for example, a mounting tube, outer sheathing, cover, cavity or other suitable component (e.g., a mounting tube comprising a plurality of elements may be adapted to allow the heat transfer away from the mounting tube). The thermal transfer gas may be indirectly heated by the element via the material. In an example, one or more resistively heated plates may be placed adjacent to a channel containing a flow of a thermal transfer gas. Alternatively, a resistively heated tube may surround the channel. The one or more resistively heated plates or the resistively heated tube may be surrounded by, for example, argon, helium, nitrogen and/or other non-reactive gas(es). The one or more resistively heated plates or the resistively heated tube may heat the channel walls, which in turn heat a thermal transfer gas (e.g., a thermal transfer gas comprising at least at least about 60% hydrogen). In another example, one or more tubes formed from the material may be provided inside of a cavity or outer tube (e.g., which may also be formed from the material). The cavity or outer tube may also comprise one or more resistive heating elements that heat the one or more tubes. The element may be provided, for example, by itself or enclosed. The cavity may be filled with, for example, argon, helium, nitrogen and/or other non-reactive gas(es). The one or more heated tubes may heat a thermal transfer gas flowing inside each tube. In yet another example, a block of the material may comprise a slot or hole containing a resistive element (e.g., the element may be inserted into an open slot). A plurality of elements may be provided (e.g., each provided in a separate slot or hole, or multiple elements provided in the same slot or hole). The slot or hole may or may not pass through the block (e.g., may or may not be a through hole). The resistive element may heat the surrounding material, which may comprises channels or holes (e.g., drilled channels or holes) through which thermal transfer gas flows. The channels or holes may pass through the block (e.g., may be through holes). The (e.g., drilled) channels or holes for the thermal transfer gas passage may be axially parallel with the elements or perpendicular to the elements (e.g., cross-drilled). The thermal transfer gas may be indirectly heated by the element via the material block. Alternatively, or in addition, the material block may be indirectly heated by a resistance heater surrounding the material block (e.g., resistance heater 1311 in FIG. 13).

Any description of element(s), mounting tube(s), outer sheathing(s), cartridge(s) and/or other Joule heating component(s) described herein in relation to direct heating of the thermal transfer gas may equally apply to (or be adapted to) indirect heating of the thermal transfer gas at least in some configurations, and vice versa. For example, indirect heating element(s) may comprise features that reduce heat flux from an element with increasing temperature of the thermal transfer gas and/or with increasing temperature of the material through which the thermal transfer gas is flowing (e.g., which may correspond to increasing temperature of the thermal transfer gas), and/or that provide thermal stress relief (e.g., element(s) may have a decreasing resistance in the direction of flow of the thermal transfer gas). A plurality of elements may be configured in parallel, multiple series in parallel, completely in series, etc. (e.g., depending on voltage and/or current configuration). An element may be a meander plate (e.g., configured with or without varying resistance).

The material disposed between the element and the thermal transfer gas may include any suitable material described herein, such as, for example, graphite, silicon carbide, and/or tungsten, molybdenum, rhenium, boron nitride, nickel, chromium, iron or alloys thereof. More than one material may be used (e.g., multiple materials may be used in configurations with multiple spaces or regions containing elements and/or multiple spaces or regions containing the thermal transfer gas, or a given boundary between spaces or regions may comprise multiple materials). Configurations with multiple spaces or regions containing elements and/or multiple spaces or regions containing the thermal transfer gas may comprise a suitable proportion (e.g., size, number, etc.) of respective spaces or regions containing the elements and the thermal transfer gas (e.g., the proportion may be configured to achieve a given thermal transfer gas temperature, suitable thermal characteristics, etc.). The respective spaces or regions may be interspersed, spaces or regions of a given type may be placed around or in between spaces or regions of another type, etc.

Figure 13:
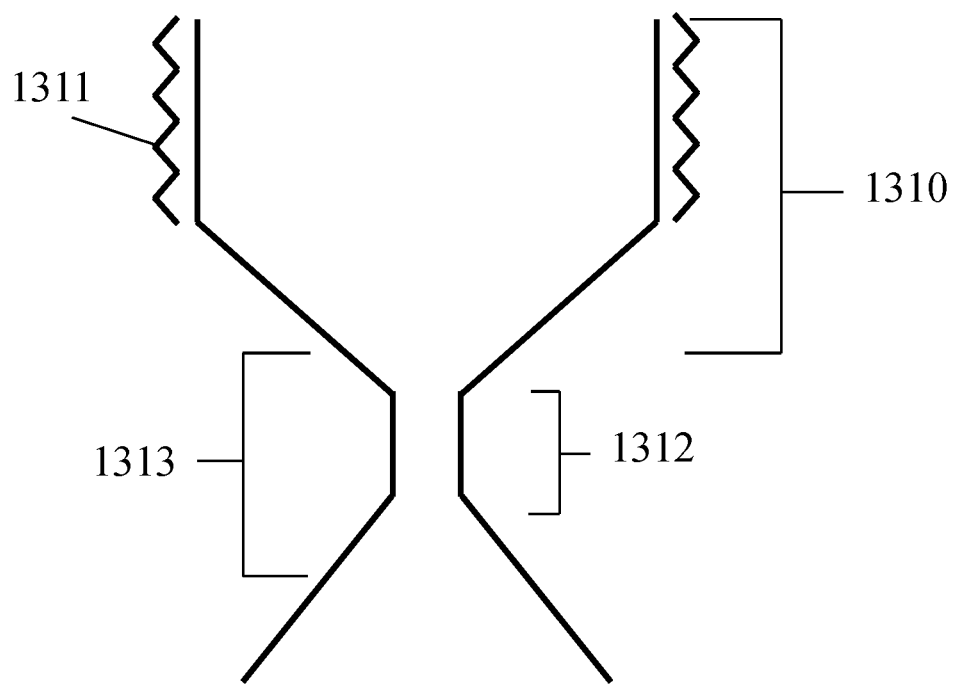
FIG. 13 is a schematic illustration of an example of yet another reactor.

FIG. 13 shows a cross-section of a part of yet another reactor. The reactor may be separated into two sections or zones, a thermal activation zone 1310 and a reactor zone 1313, with natural gas or other feedstock injection taking place in the area in-between. A top region 1310 may comprise a thermal activation zone (where the thermal transfer gas is heated up). The thermal activation zone may comprise a resistance heater 1311. The resistance heater may comprise or be one or more resistive elements. The resistive element(s) may heat at least a portion of a wall of the reactor, which may then heat the thermal transfer gas. Thus, the resistive element(s) may indirectly heat the thermal transfer gas. The thermal transfer gas (e.g., which may be heated up to about 3,000° C.) may mix rapidly with the reactive gas (feedstock). The rapid mixing of the thermal transfer gas with the reactive gas may reduce or eliminate inhomogeneity in the finished product (e.g., carbon black) that may occur if the reactive gas is heated to high temperatures directly. A middle region 1312 may comprise a throat. The hydrocarbon may enter the reactor and mix with the thermal transfer gas in an injection zone 1313. The injection zone 1313 may comprise or encompass the throat and some additional space upstream and downstream of the throat. The reactor may comprise a reaction zone that includes any area in the reactor past the point of the injection of the hydrocarbon feedstock.

Graphite may be used as the material of construction of elements, and walls of thermal activation, throat and injection zones described herein. The element(s) may comprise or be graphite. The element(s) may comprise or be tungsten, molybdenum, rhenium, boron nitride, nickel, chromium, iron, or alloys thereof. The injector(s) may comprise or be, for example, water-cooled copper, graphite or alloys of high temperature corrosion resistant metals. The injector(s) (e.g., graphite) may be cooled by, for example, water or a non-oxidizing liquid (e.g., mineral oil, ethylene glycol, propylene glycol, synthetic organic fluids such as, for example, DOWTHERM™, etc.). See, for example, commonly assigned, co-pending Int. Pat. Publication No. WO 2015/116800 ("PLASMA GAS THROAT ASSEMBLY AND METHOD"), which is entirely incorporated herein by reference. When handling hydrogen at these temperatures, special care may be taken in order to reduce or eliminate oxygen and/or to contain the hydrogen within the systems (e.g., reactor systems) described herein.

Systems and methods of the present disclosure may be combined with or modified by other systems and/or methods, such as chemical processing and heating methods, chemical processing systems, reactors and plasma torches described in U.S. Pat. Pub. No. US 2015/0210856 and Int. Pat. Pub. No. WO 2015/116807 ("SYSTEM FOR HIGH TEMPERATURE CHEMICAL PROCESSING"), U.S. Pat. Pub. No. US 2015/0211378 ("INTEGRATION OF PLASMA AND HYDROGEN PROCESS WITH COMBINED CYCLE POWER PLANT, SIMPLE CYCLE POWER PLANT AND STEAM REFORMERS"), Int. Pat. Pub. No. WO 2015/116797 ("INTEGRATION OF PLASMA AND HYDROGEN PROCESS WITH COMBINED CYCLE POWER PLANT AND STEAM REFORMERS"), U.S. Pat. Pub. No. US 2015/0210857 and Int. Pat. Pub. No. WO 2015/116798 ("USE OF FEEDSTOCK IN CARBON BLACK PLASMA PROCESS"), U.S. Pat. Pub. No. US 2015/0210858 and Int. Pat. Pub. No. WO 2015/116800 ("PLASMA GAS THROAT ASSEMBLY AND METHOD"), U.S. Pat. Pub. No. US 2015/0218383 and Int. Pat. Pub. No. WO 2015/116811 ("PLASMA REACTOR"), U.S. Pat. Pub. No. US2015/0223314 and Int. Pat. Pub. No. WO 2015/116943 ("PLASMA TORCH DESIGN"), Int. Pat. Pub. No. WO 2016/126598 ("CARBON BLACK COMBUSTABLE GAS SEPARATION"), Int. Pat. Pub. No. WO 2016/126599 ("CARBON BLACK GENERATING SYSTEM"), Int. Pat. Pub. No. WO 2016/126600 ("REGENERATIVE COOLING METHOD AND APPARATUS"), U.S. Pat. Pub. No. US 2017/0034898 and Int. Pat. Pub. No. WO 2017/019683 ("DC PLASMA TORCH ELECTRICAL POWER DESIGN METHOD AND APPARATUS"), U.S. Pat. Pub. No. US 2017/0037253 and Int. Pat. Pub. No. WO 2017/027385 ("METHOD OF MAKING CARBON BLACK"), U.S. Pat. Pub. No. US 2017/0058128 and Int. Pat. Pub. No. WO 2017/034980 ("HIGH TEMPERATURE HEAT INTEGRATION METHOD OF MAKING CARBON BLACK"), U.S. Pat. Pub. No. US 2017/0066923 and Int. Pat. Pub. No. WO 2017/044594 ("CIRCULAR FEW LAYER GRAPHENE"), U.S. Pat. Pub. No. US20170073522 and Int. Pat. Pub. No. WO 2017/048621 ("CARBON BLACK FROM NATURAL GAS"), Int. Pat. Pub. No. WO 2017/190045 ("SECONDARY HEAT ADDITION TO PARTICLE PRODUCTION PROCESS AND APPARATUS"), Int. Pat. Pub. No. WO 2017/190015 ("TORCH STINGER METHOD AND APPARATUS"), U.S. Pat. No. 1,339,225 ("PROCESS OF MANUFACTURING GASEOUS FUEL"), U.S. Pat. No. 7,462,343 ("MICRO-DOMAIN GRAPHITIC MATERIALS AND METHOD FOR PRODUCING THE SAME"), U.S. Pat. No. 6,068,827 ("DECOMPOSITION OF HYDROCARBON TO CARBON BLACK"), U.S. Pat. No. 7,452,514 ("DEVICE AND METHOD FOR CONVERTING CARBON CONTAINING FEEDSTOCK INTO CARBON CONTAINING MATERIALS, HAVING A DEFINED NANOSTRUCTURE"), U.S. Pat. No. 2,062,358 ("CARBON BLACK MANUFACTURE"), U.S. Pat. No. 4,199,545 ("FLUID-WALL REACTOR FOR HIGH TEMPERATURE CHEMICAL REACTION PROCESSES"), and U.S. Pat. No. 5,206,880 ("FURNACE HAVING TUBES FOR CRACKING HYDROCARBONS"), each of which is entirely incorporated herein by reference.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making carbon particles, comprising:
   (a) preheating a thermal transfer gas by resistive heating, thereby obtaining a preheated thermal transfer gas;
   (b) in a reactor, heating the preheated thermal transfer gas with a plasma heater, thereby obtaining a heated thermal transfer gas; and
   (c) in the reactor, contacting the heated thermal transfer gas with a hydrocarbon feedstock to generate the carbon particles and hydrogen gas.

2. The method of claim 1, wherein the resistive heating comprises using one or more resistive heating elements selected from the group consisting of graphite, tungsten, molybdenum, rhenium, boron nitride, nickel, chromium, iron, and alloys thereof.

3. The method of claim 1, further comprising: (d) supplying greater than or equal to about 750 kW of power to one or more resistive heating elements that provide the resistive heating.

4. The method of claim 1, wherein the contacting is at (i) a thermal transfer gas flowrate greater than or equal to about 500 $Nm^3$/hr (normal cubic meter/hour), or (ii) a hydrocarbon feedstock flowrate greater than or equal to about 675 $Nm^3$/hr.

5. The method of claim 1, wherein the hydrocarbon feedstock comprises (i) at least about 70% by weight methane, ethane, propane, or mixtures thereof, or (ii) one or more aromatic hydrocarbons, one or more unsaturated hydrocarbons, one or more oxygenated hydrocarbons, or any combination thereof.

6. The method of claim 1, wherein the hydrocarbon feedstock comprises methane, ethane, propane, butane, benzene, toluene, xylene, methyl naphthalene, pyrolysis fuel oil, coal tar, coal, heavy oil, oil, bio-oil, bio-diesel, biologically derived hydrocarbon, ethylene, acetylene, butadiene, styrene, ethanol, methanol, propanol, phenol, ketones, ethers, esters, or any combination thereof.

7. The method of claim 1, wherein more than about 90% of the hydrocarbon feedstock is converted into carbon particles on a weight percent carbon basis.

8. The method of claim 1, wherein (i) the hydrocarbon feedstock is pre-heated from a first temperature to a second temperature before coming into contact with the heated thermal transfer gas, and wherein the second temperature is between about 100° C. and about 800° C., or (ii) the thermal transfer gas is heated via a heat exchanger prior to the resistive heating.

9. The method of claim 1, wherein the thermal transfer gas comprises.

10. The method of claim 9, wherein the thermal transfer gas comprises greater than about 60% hydrogen.

11. The method of claim 1, wherein more than about 60% of the heat contained in the heated thermal transfer gas is transferred to the hydrocarbon feedstock within about 2 seconds of initial exposure to the heated thermal transfer gas.

12. A method of making carbon particles, comprising:
  (a) preheating a thermal transfer gas with aid of resistive heating, thereby obtaining a preheated thermal transfer gas;
  (b) in a reactor, heating the preheated thermal transfer gas with a plasma heater, thereby obtaining a heated thermal transfer gas; and
  (c) in the reactor, mixing the heated thermal transfer gas with a hydrocarbon feedstock to generate the carbon particles.

13. The method of claim 12, further comprising, in (c), mixing the heated thermal transfer gas with the hydrocarbon feedstock downstream of the resistive heating.

14. The method of claim 12, wherein the carbon particles comprise carbon black.

15. The method of claim 14, wherein the carbon black has a surface area greater than about 20 square meters per gram ($m^2/g$).

16. The method of claim 12, further comprising (i) in the reactor, heating the preheated thermal transfer gas to at least about 2,000° C., (ii) heating the preheated thermal transfer gas in an oxygen free environment, or (iii) a combination thereof.

17. The method of claim 12, further comprising further heating the preheated thermal transfer gas with aid of an electric arc based plasma heating downstream of the resistive heating.

* * * * *